Oct. 2, 1951 W. T. GOLLWITZER 2,570,112
PRINTING MACHINE
Filed April 10, 1945 19 Sheets-Sheet 3

INVENTOR.
Walter T. Gollwitzer
BY
Wallace and Cannon
ATTORNEYS

Oct. 2, 1951  W. T. GOLLWITZER  2,570,112
PRINTING MACHINE
Filed April 10, 1945  19 Sheets-Sheet 4

INVENTOR.
Walter T. Gollwitzer
BY
Wallace and Cannon
ATTORNEYS

Oct. 2, 1951  W. T. GOLLWITZER  2,570,112
PRINTING MACHINE
Filed April 10, 1945  19 Sheets-Sheet 6

INVENTOR.
Walter T. Gollwitzer
BY
Wallace and Cannon
ATTORNEYS

Oct. 2, 1951 W. T. GOLLWITZER 2,570,112
PRINTING MACHINE
Filed April 10, 1945 19 Sheets-Sheet 8

INVENTOR.
Walter T. Gollwitzer
BY
Wallace and Connon
ATTORNEYS

Oct. 2, 1951 — W. T. GOLLWITZER — 2,570,112
PRINTING MACHINE
Filed April 10, 1945 — 19 Sheets-Sheet 10

INVENTOR.
Walter T. Gollwitzer
BY
Wallace and Cannon
ATTORNEYS

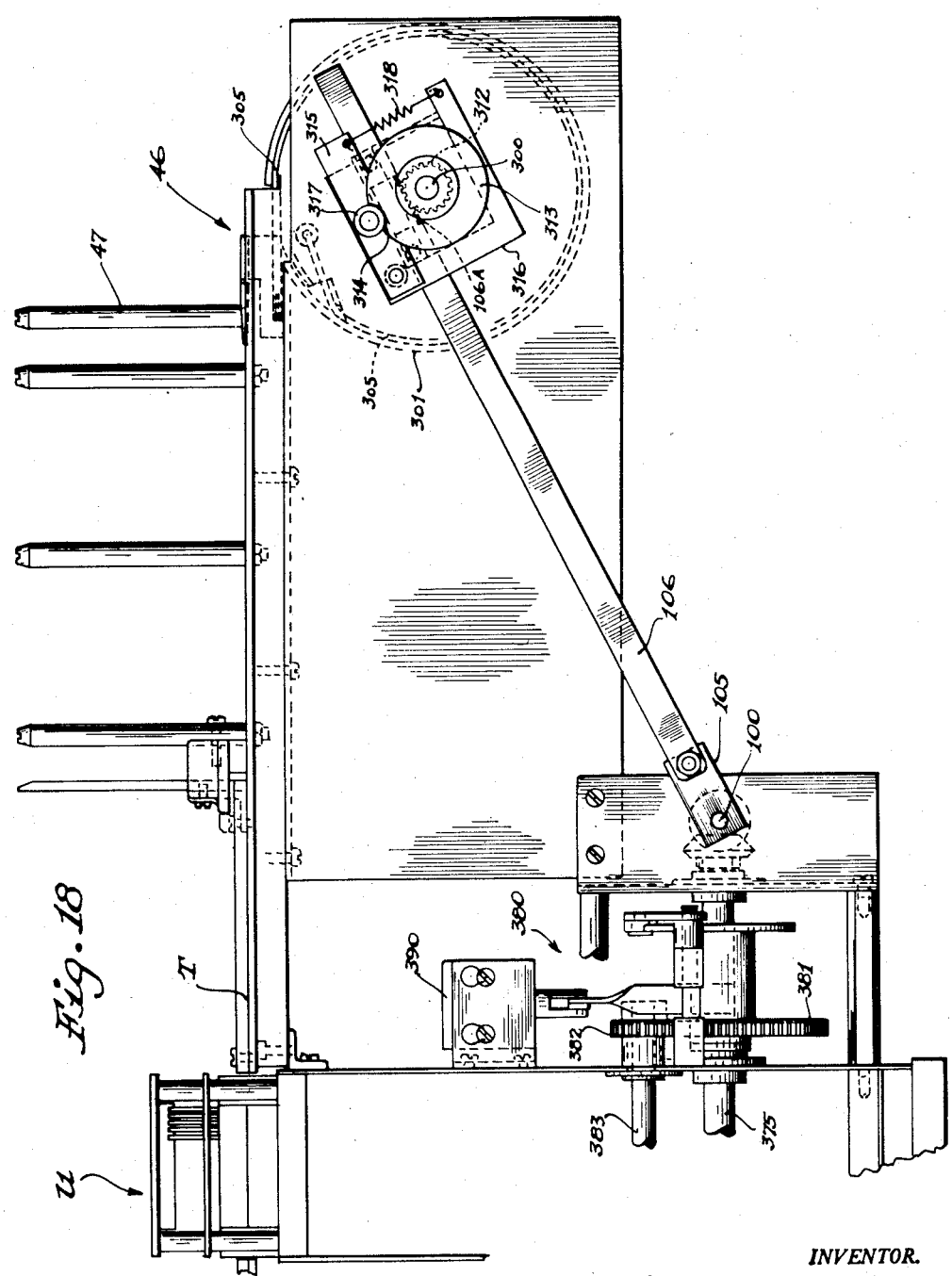

Oct. 2, 1951 — W. T. GOLLWITZER — 2,570,112
PRINTING MACHINE
Filed April 10, 1945 — 19 Sheets-Sheet 12
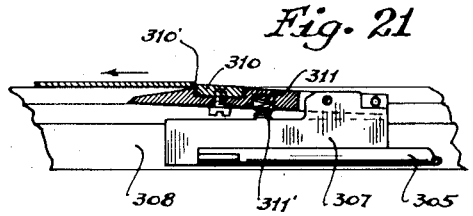
Fig. 21
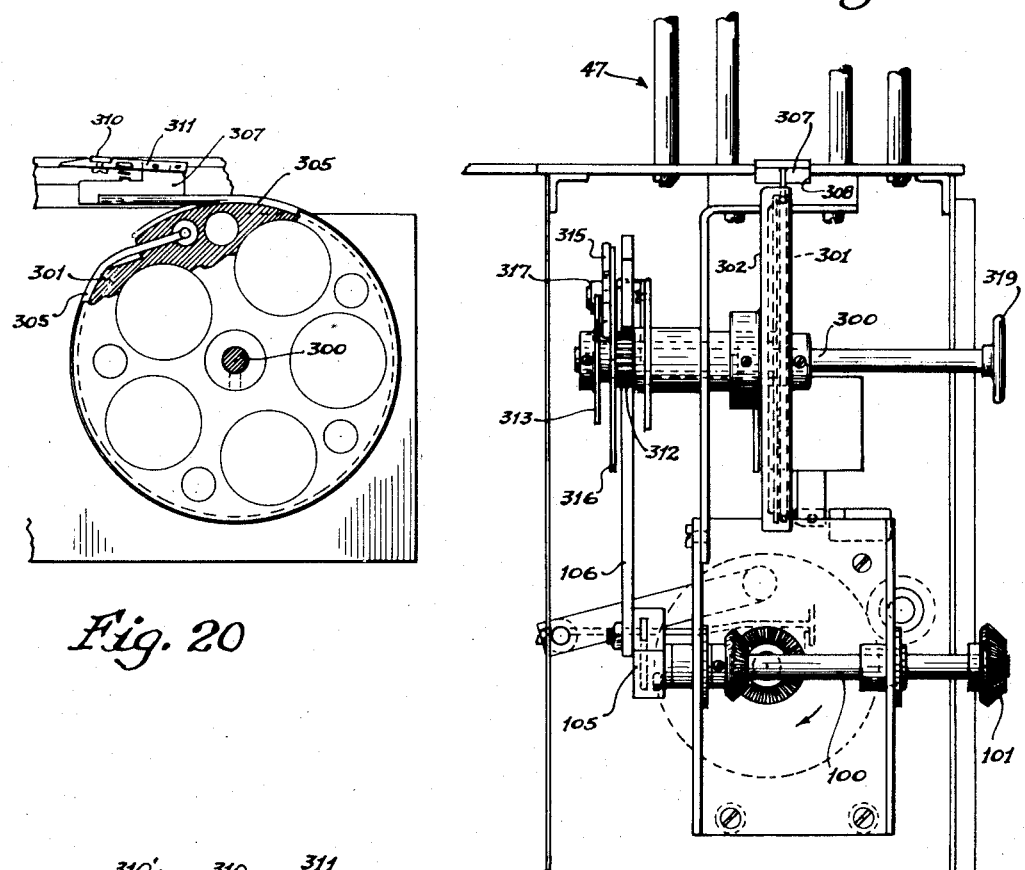
Fig. 19
Fig. 20
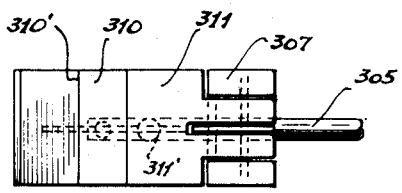
Fig. 22
INVENTOR.
Walter T. Gollwitzer
BY
Wallace and Cannon
ATTORNEYS Oct. 2, 1951  W. T. GOLLWITZER  2,570,112
PRINTING MACHINE
Filed April 10, 1945  19 Sheets-Sheet 14

INVENTOR.
Walter T. Gollwitzer
BY
Wallace and Cannon
ATTORNEYS

Oct. 2, 1951 W. T. GOLLWITZER 2,570,112
PRINTING MACHINE
Filed April 10, 1945 19 Sheets-Sheet 15

INVENTOR.
Walter T. Gollwitzer
BY
Wallace and Cannon
ATTORNEYS

Oct. 2, 1951  W. T. GOLLWITZER  2,570,112
PRINTING MACHINE
Filed April 10, 1945  19 Sheets-Sheet 16
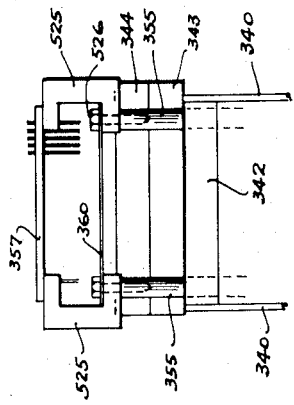
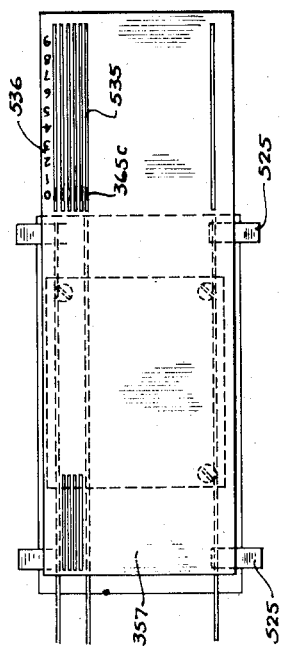
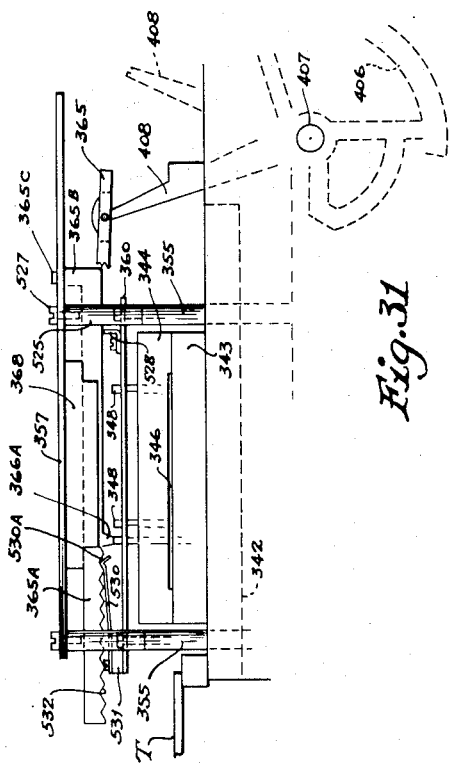
INVENTOR.
Walter T. Gollwitzer
BY
Wallace and Cannon
ATTORNEYS

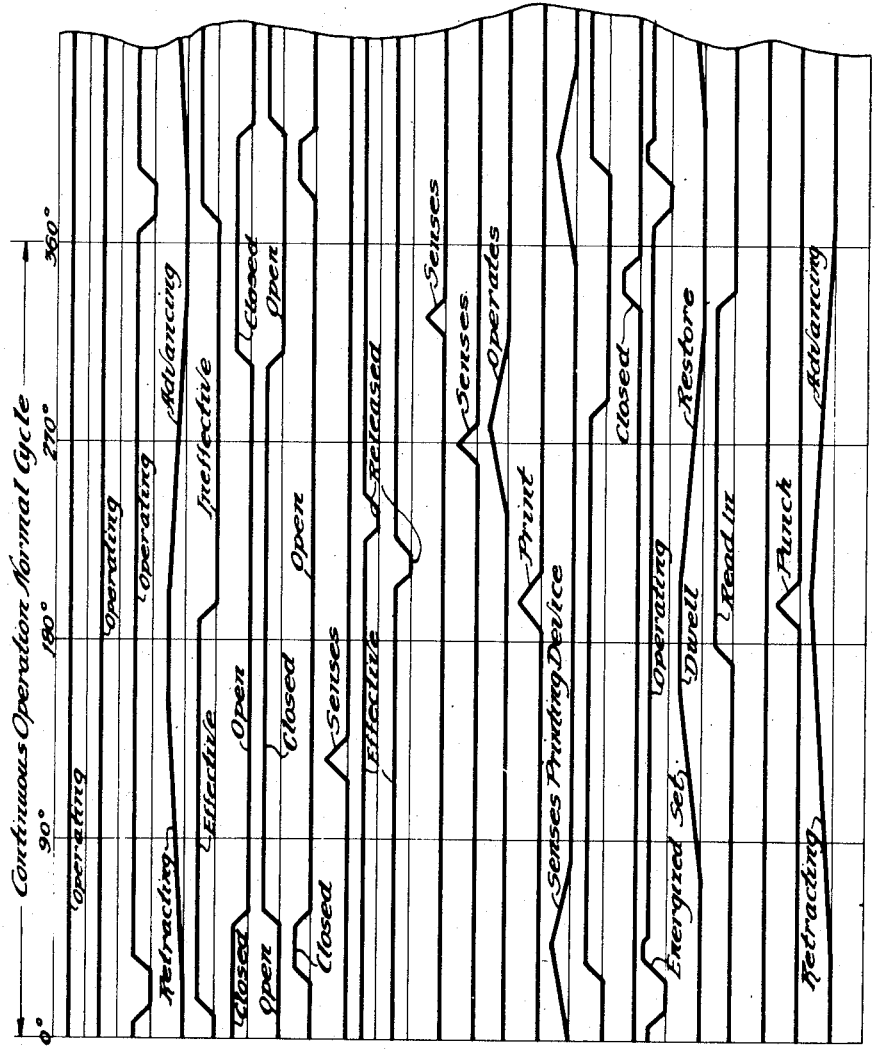

Fig. 34.

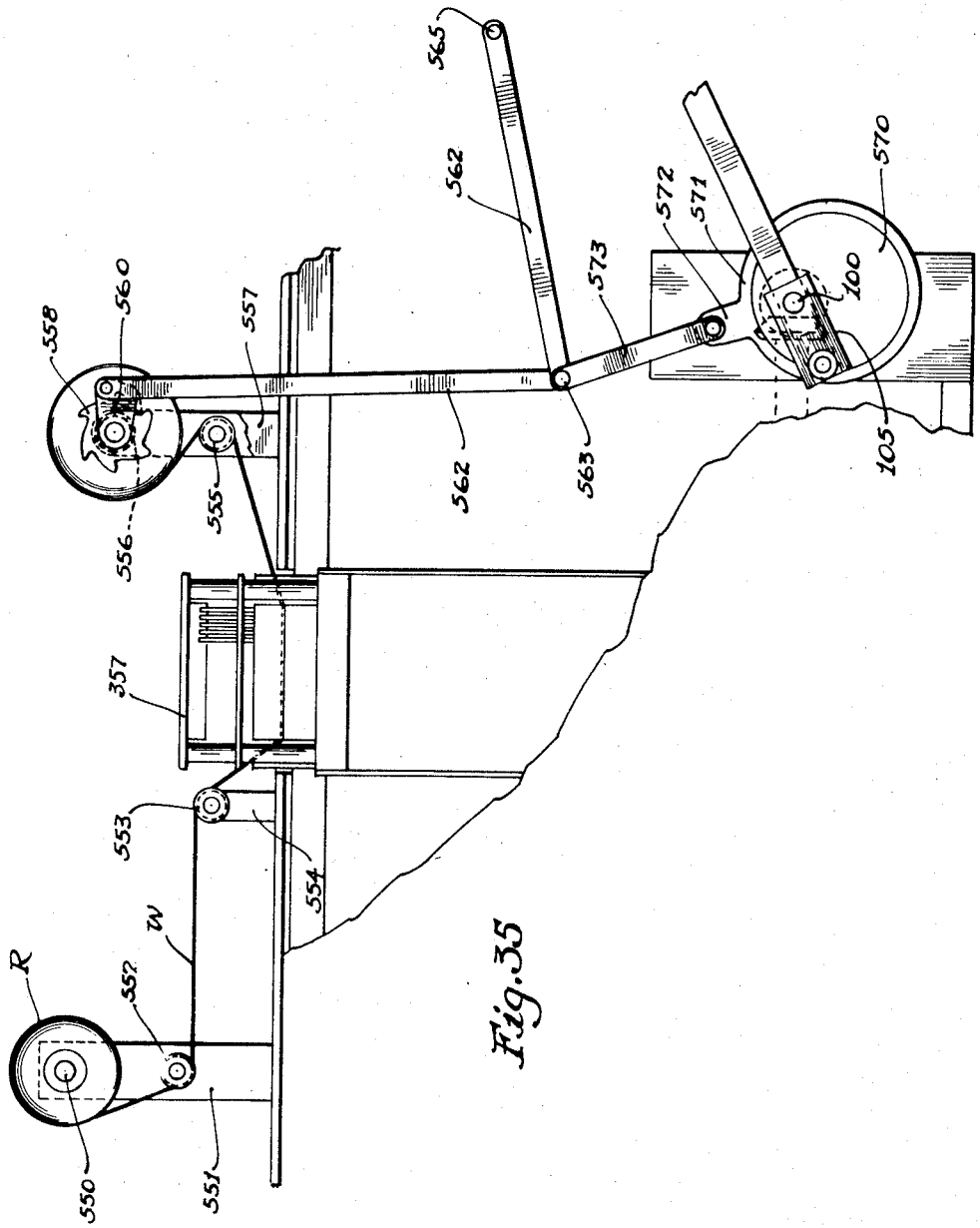

Patented Oct. 2, 1951

2,570,112

UNITED STATES PATENT OFFICE 2,570,112

PRINTING MACHINE

Walter T. Gollwitzer, Euclid, Ohio, assignor to Addressograph-Multigraph Corporation, Wilmington, Del., a corporation of Delaware Application April 10, 1945, Serial No. 587,579

10 Claims. (Cl. 235—60.31)

This invention relates to printing machines and particularly to such printing machines adapted for producing business instruments and the like that embody coded data representing perforations.

One situation where business instruments of the aforesaid character are produced in large numbers is found in payroll or similar work where card checks are prepared for a relatively large payroll. Such card checks have printed information thereon to set forth the name and other identification of or data relating to the payee, the check number, the amount of the check and other accounting data that may be helpful in the handling of the checks after the checks have been cashed, and all or a part of the foregoing information is also represented on the checks by coded perforations so that the checks may be subjected to tabulating, sorting or like operations. In the preparation of checks where the amount is the same for each pay or disbursement period the printed information may be advantageously produced on the checks through the use of printing devices having type characters formed thereon whereby the desired information may be printed directly from the printing devices onto the checks, and it is an important object of the present invention to enable such printing devices also to be utilized to control the formation of the coded data representations on the checks in the same machine where the printed impressions are formed on the checks.

Another and related object is to enable the numerical amounts that are represented on a series of card checks produced as aforesaid to be accumulated, and a related object is to enable such accumulated amounts to be represented in group cards produced after a predetermined number of card checks have been passed through the machine. Further objects related to the foregoing are to enable the preparation of such card checks to be accomplished in such a manner that when a group or total card is produced for a particular group of card checks, the relationship between the card checks that are then in the process of production in the machine will not be disturbed; to enable total cards to be prepared in respect to each group in such a way that such total cards may readily be assembled with the respective groups to which they pertain so as to thereby facilitate further accounting and checking operations; to eject the total cards from the sheet guideway so that such cards are readily accessible to the operator; and to effect such ejection of the total cards automatically as an incident to the operation of the mechanism through a total cycle.

Other and more specific objects of the invention are to enable movements of the sheets or cards through the machine to be governed by a pair of stop finger cam shafts; to operate the two stop finger cam shafts in timed relation during normal cycles of machine operation, and to utilize but one of the cam shafts in special or total cycles of operation.

Where numerical amounts are being punched into the columns of a card it is important that the card be accurately located with respect to the punching elements, and to simplify the attainment of this result is a further object of the present invention. More specifically it is an object of this invention to apply a continuous and accurately regulated advancing force to such a card while it is located at punching position, thereby to maintain the card in contact with the stop means that determine the location of the card at such position, and a further object is to augment such continuous force when the card is to be discharged from punching position so as to thereby attain rapid discharge of the card.

In the use of a machine of the kind to which the present invention relates it is often desirable to preserve a record of the amounts that have been punched into the business instruments or checks, and to enable this to be done in a simple and expeditious manner is another object of the present invention. More specifically it is an object of the present invention to enable a web of paper to be led through the punching station of the machine so that perforations may be formed in the web of paper as an incident to the production of the business instruments or checks by the machine.

Further objects of the invention are to render operation of the accumulating and punching means dependent not only on proper location of a printing and control device at sensing station but also upon proper operation of the sensing means; to enable the machine to be automatically stopped when an overload condition arises in the printing device advancing means; to afford an overload release means in the drive of the printing device advancing means; and to effect stopping of the machine under control of such overload release means.

Other and further objects of the present invention will be apparent from the following description and claims are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 18 is a fragmental front elevational view of the card feed mechanism with the cover removed;

Fig. 19 is an end elevational view of the card feed mechanism as viewed from the right in Fig. 18;

Fig. 20 is a vertical sectional view taken along the line 20—20 in Fig. 19;

Fig. 21 is a vertical sectional view of the card engaging slide;

Fig. 22 is a plan view of the card engaging slide;

Fig. 30 is a plan view of a manual set up mechanism that is included in the punching mechanism for manually setting selected orders of the punching mechanism;

Fig. 31 is a diagrammatic view illustrating the relationship between the manual set up mechanism and the set up mechanism that is controlled by the accumulator;

Fig. 32 is an end view of the punching mechanism;

Fig. 33 is a timing chart illustrating the normal cycle of operation of the machine;

Fig. 34 is a timing chart illustrating the total cycle; and

Fig. 35 is a fragmental view illustrating the machine as embodied when a proof strip is to be produced by the punching means.

Figure 1:
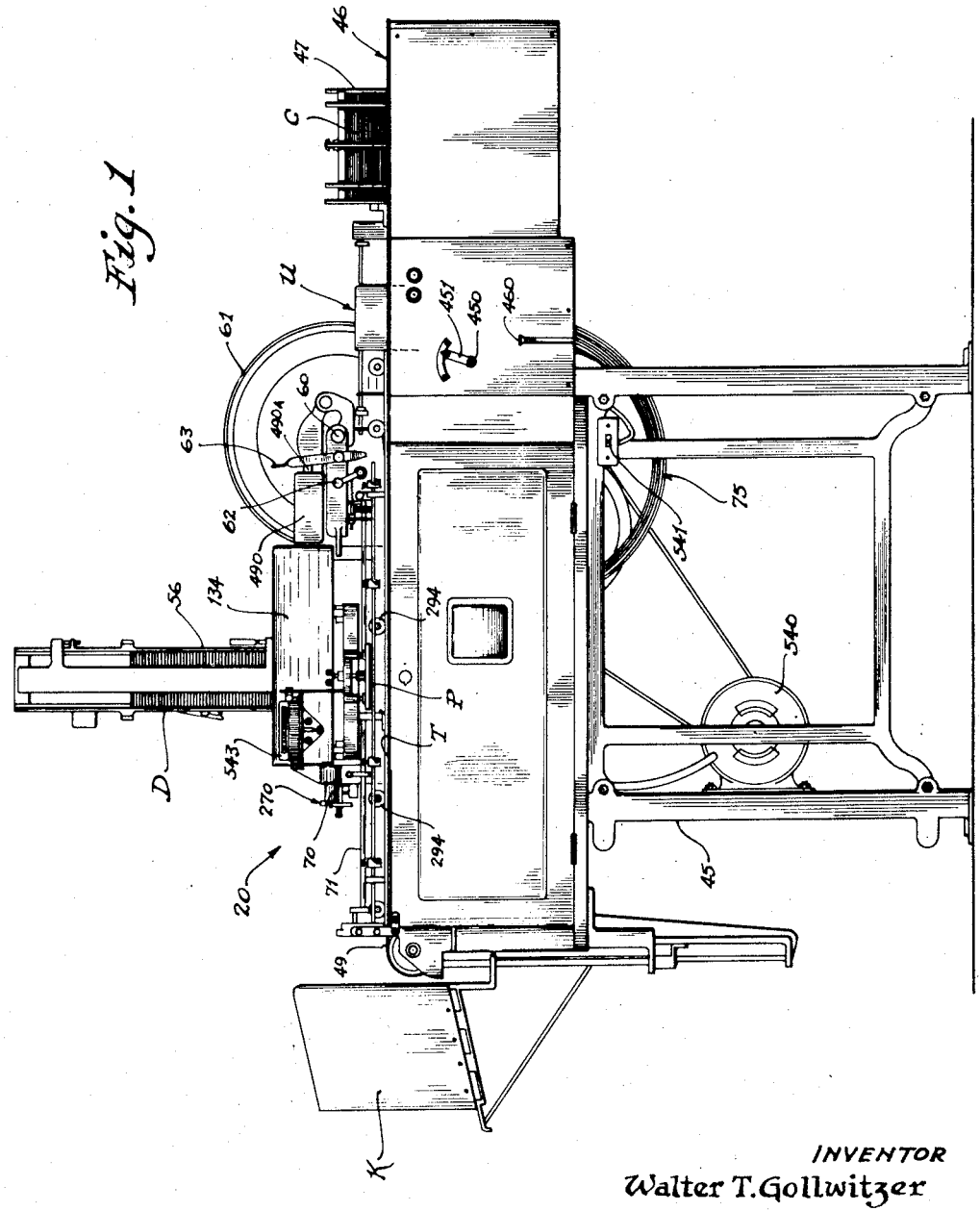
Fig. 1 is a front elevational view of a machine embodying the features of the invention.
Figure 3:
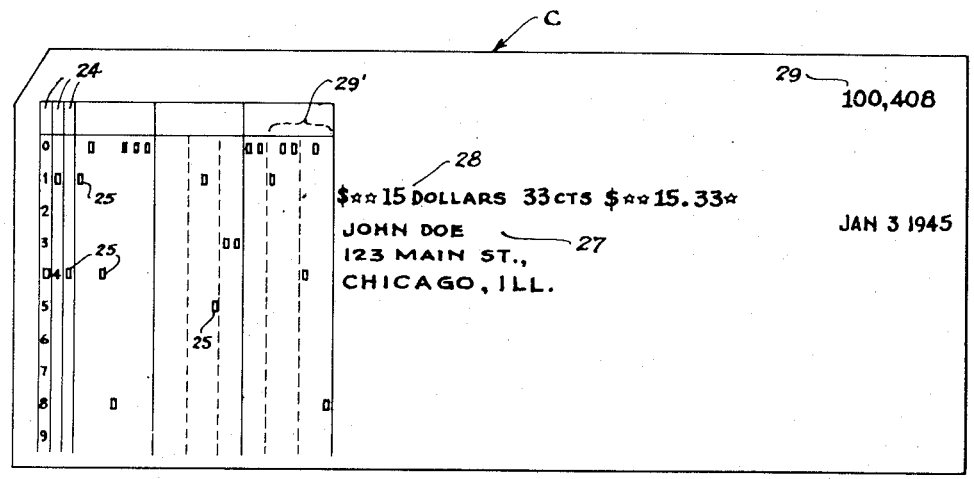
Fig. 3 is a face view of a card check that may be produced on the machine shown in Fig. 1.
Figure 4:
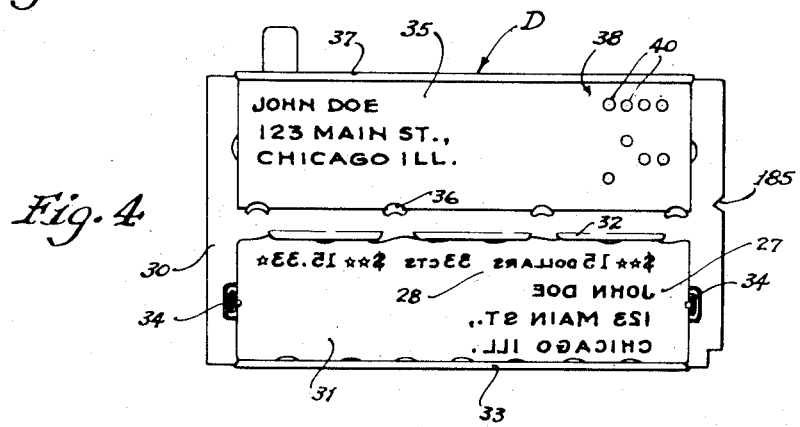
Fig. 4 is a face view of a printing and control device adapted to be used in the machine shown in Fig. 1.

For purposes of disclosure the invention has been herein illustrated as embodied in a printing machine 20, Fig. 1, that is particularly adapted for the production of card checks C shown in Fig. 3, and such checks are produced from and under control of printing and control devices D shown in detail in Fig. 4 of the drawings. The card check C is substantially in the form of the conventional Hollerith card having a plurality of vertically extending columns 24, in each of which an appropriately located perforation 25 may be formed so as to represent the digit of an order of a numerical amount. In such cards the numerical amounts are represented in accordance with a 10-element code, so that each column 24 has index points numbered from 1 to 9 inclusive and also has a zero index point disposed adjacent to the "1" index point. The card check C has the usual cut-away corner 26 to facilitate proper positioning and arrangement of the cards in the various kinds of machines through which such cards are passed, and the various identifying information such as the name and address of the payee of the check are printed thereon from the printing device D as at 27 when the card and the printing device are located at the printing station of the machine. The numerical amount of the check is printed thereon as at 28, such amount being printed from the printing device D, and in the present case each card check has a serial number 29 thereon but such serial number is preprinted on the card, and this serial number is also pre-punched as at 29' in certain of the columns 24 of the card.

The printing and control device D as shown in Fig. 4 is typical of such devices that may be employed in the present machine and this printing device includes a carrier or frame 30 having a metallic printing plate 31 removably retained thereon by retaining devices 32 and a bead 33 formed along the lower edge of the frame, the retaining devices 32 and the bead 33 cooperating with yieldable retaining tongues 34 to hold the printing plate 31 in position on the frame. Type characters are embossed on the printing plate 31 so as to appear in relief on one face thereof, and the plate is mounted on the frame in such a relation that this face having the embossed type characters in relief thereon is exposed so that impressions may be made from the type characters when the printing device is in its operative position beneath the inking ribbon at the printing position of the machine. The type characters that are thus embossed on the printing plate 31 correspond with the identifying data 27 and the money amount 28 that are to be printed on the card C, and it will be recognized of course that other data may be included on the printing plate in accordance with known practice. The printing and control device D shown in Fig. 4 also bears an identification card 35 on which an index impression is made from at least certain of the type characters of the printing plate. The identification or index card 35 is removably retained on the frame 30 above the printing plate 31 by suitable retaining devices 36 and an upper bead 37 formed on the frame. The right-hand end of the card 35 also serves as a control card in the present instance and overlies a control area 38 in which control perforations 40 may be formed in columns so as to represent numerical amounts. The control perforations in the present instance are formed in accordance with the 5-element positional code shown in Fig. 5 of the drawings, and the perforations extend through the card 35 as well as the overlying portion of the frame 30. In the present instance the control perforations 40 are related to the numerical amount 28 that is to be printed on the card or check C, the amount of the check being represented by the perforations 40 so that these perforations may serve to control the production of the amount representing perforations 24 in the related columns 25 of the card or check C.

The printing machine 20 of the present invention embodies a frame 45 having a table top T with a sheet guideway G extended longitudinally along the table top so that sheets or cards such as the card checks C may be fed longitudinally along the table top T in the sheet guideway G first to a punching station defined by an adding and punching unit U, and then to a printing station defined in the guideway G beneath a platen P. The sheets or cards C are fed one by one into the sheet guideway G by a card feed mechanism 46 that will be described in detail hereinafter. When a card C has been separated from the bottom of a pack of cards mounted in a hopper 47 of the card feed mechanism, such card is brought into contact with constantly operating feed belts 48 and 49 that are disposed in the sheet guideway. The two belts 48 and 49 are connected to a common drive pulley 50 that is mounted and constantly driven in the manner described in Gollwitzer Patent No. 2,002,772 patented May 28, 1935.

Figure 11:
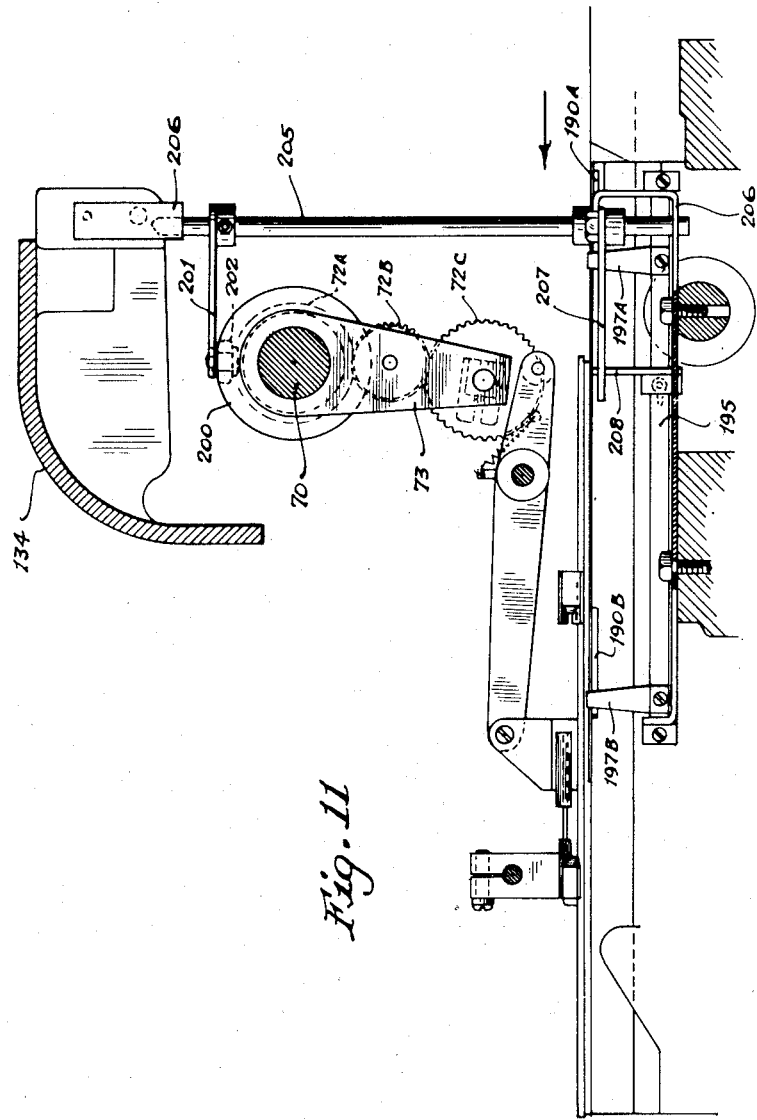
Fig. 11 is a vertical sectional view taken substantially along the line 11—11 of Fig. 9.
Figure 12:
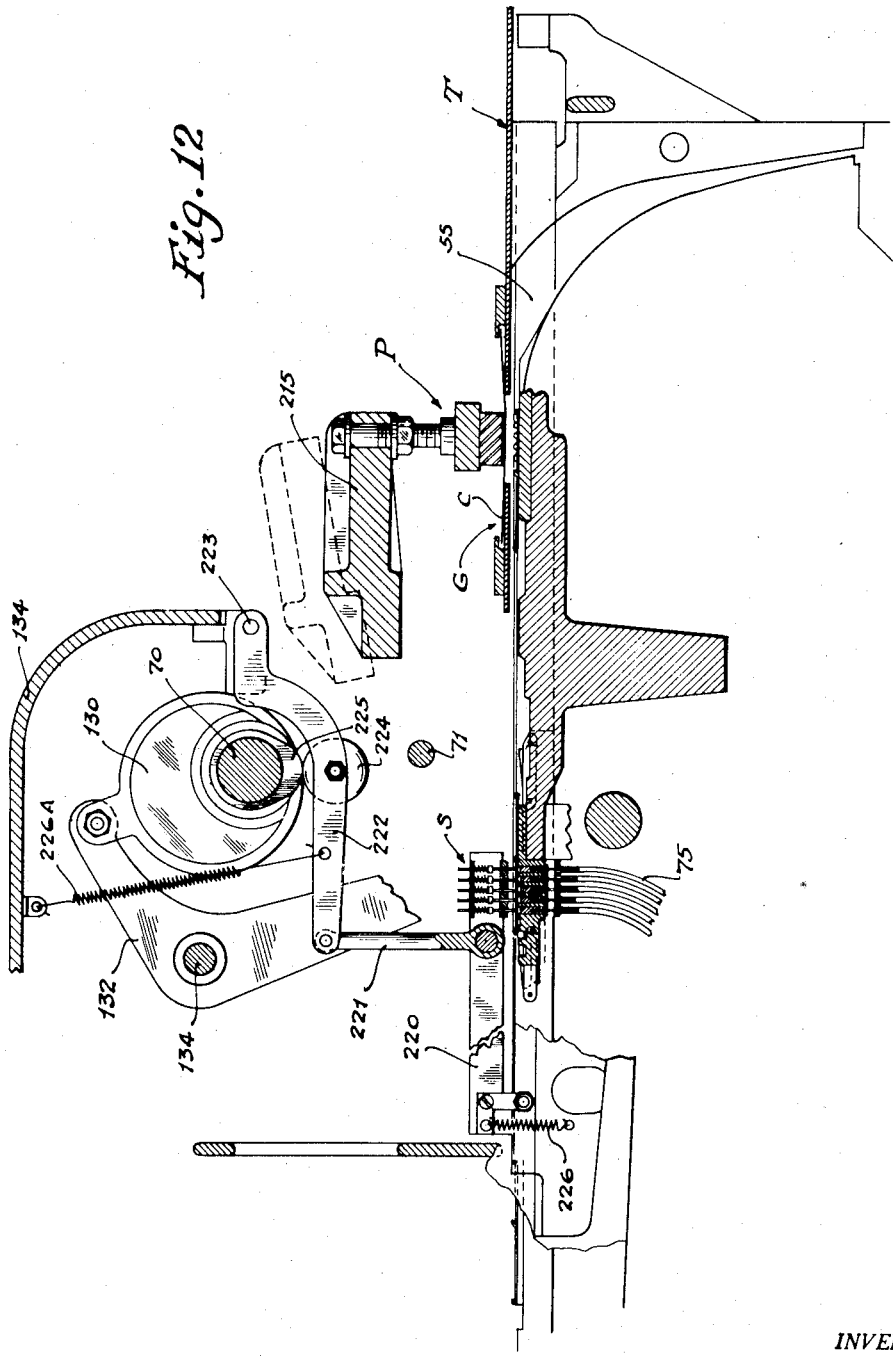
Fig. 12 is a fragmental vertical sectional view illustrating the manner in which the sensing means are operated from the main cam shaft of the machine.
Figure 13:
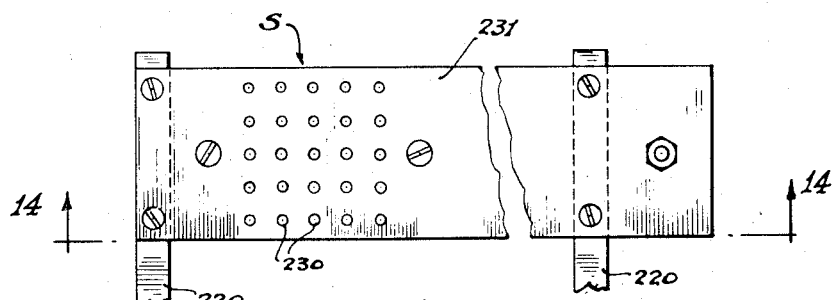
Fig. 13 is a plan view of the sensing head of the machine.

In its principal elements, the machine 20 of the present invention is constructed and arranged in substantially the manner described in the aforesaid Gollwitzer patent, but in the present machine the drive for the stop finger control means has been changed and the means for advancing the printing and control devices D through the machine has been substantially modified so as to attain accuracy of location of the printing devices in a printing device guideway 55 that extends forwardly beneath the table top T from a supply magazine 56. In the machine 20 of the present invention a main shaft 60 is extended from front to rear in the machine and is driven from a constantly operated flywheel 61 by clutch means of the one-revolution type that are under control of a main starting lever 62 and a stop lever 63. The starting lever 62 corresponds to the start lever 290 of the aforesaid Gollwitzer patent, while the stop lever 63 of the present invention corresponds to the stop lever 304 of the aforesaid Gollwitzer patent. When the start lever 62 is moved in a counterclockwise direction to the position shown in Fig. 1 of the drawings, the associated clutch means are engaged and are latched in such engaged relationship as described in the aforesaid Gollwitzer Patent No. 2,002,772, and this drives a main cam shaft 70 of the machine as well as a main stop finger cam shaft 71 that extends along the rear portion of the frame just above the table top T and rearwardly of the sheet guideway G. The drive for the shaft 71 is shown in Fig. 11, and includes gears 72A, 72B and 72C, and mounting plates 73 for supporting the intermediate gear 72B, and the driving relationship between the main drive shaft 60 and the cam shaft 70 and between the shafts 70 and 71 is such that all of these shafts operate in a one-to-one relationship.

In the present machine the main cam shaft 70 serves as the driving means for most of the operative mechanisms of the machine as such mechanisms are involved in the advancing of the printing devices and the production of printed impressions on the cards C, and it will be observed that the printing devices in their advancing movement along the printing device guideway 55 are moved in a step-by-step manner so that each printing and control device D first comes to rest at a sensing station defined beneath a sensing head S, while in the next cycle of operation of the advancing means, such printing and control device is advanced to printing position beneath the platen P. After an impression has been made from the printing device D at printing position, this printing device is advanced along the printing device guideway and is discharged downwardly into a collecting drawer in the same general manner as in the aforesaid Gollwitzer Patent No. 2,002,772.

When a printing device is located at the sensing station, the sensing head S is moved downwardly through a sensing stroke as will be hereinafter described in detail, and in accordance with the perforations 40 that are detected in the particular printing device, Bowden cables 75 are selectively actuated so as to set up the adding and punching unit U. When such set-up operation has been accomplished, the adding and punching unit U is started through a cycle of operation, this unit being under control of a one-revolution clutch mechanism that is in turn controlled by means that operate to initiate a cycle of operation of the unit U whenever a printing device is properly sensed by the sensing head S.

In the course of operation of the adding and punching unit U, the perforations 25 are formed in the card C to represent the amount sensed from the control field 38 of the related printing and control device D, and the amount represented by such perforations is entered into an accumulator that forms a part of the unit U. After the punching operation has been completed, the card C is released from punching position and is advanced along the card guideway G to printing position beneath the platen P, the card C being stopped in printing position by a stop finger 77 mounted intermediate its ends on a supporting shaft 78 and actuated by a cam 79 fixed on the main stop finger cam shaft 71. It may be observed that after the sensing operation has been completed by the sensing head S, the printing and control device D is advanced along the printing device guideway 55 to the printing position beneath the platen P, so that at the end of a particular cycle of operation of the machine, the card C that has been perforated in this cycle will be located at the printing position in the proper relation to the same printing device from which the punched amount has been derived, and hence in the next cycle of operation, the desired impression on the card may be produced.

When large numbers of checks are being produced, it is necessary that such production be accomplished in a way that affords an adequate accounting control whereby the accuracy of production of the checks may be verified, and in order that this may be accomplished, the present machine provides for production of the checks in groups of relatively small size, as for example, groups that include 50 such checks. Thus the present machine is arranged to stop after fifty checks C have been produced, and since the checks are preprinted so as to include serial numbers 29, the accuracy of the check-counting mechanism may readily be verified. After the machine has produced such a group of checks, the machine is stopped and the operator initiates a group total operation of the adding and punching unit U. In the course of such a group total operation, the total of the amounts of the group of checks is read out of the group total accumulator of the machine and is read into what may be termed a grand total accumulator of the machine. The group total that is thus read out of the machine is set up in the punching elements of the unit U and is punched into the card C that is then in the punching position. Upon completion of the punching of the total card, this card is released by the stop finger 85 so as to move along the sheet guideway G and toward printing position. This total card however is ejected from the sheet guideway by means that are rendered effective when the adding unit U is set for the group total operation, and hence the total card, at the end of such a total operation of the unit U, is disposed outside of the sheet guideway G. The operator then takes this total card and places it with the group of cards to which it relates, such group of cards having been collected in a sheet collector K at the left-hand end of the machine as viewed in Fig. 1, the group of cards and the related total card being then placed in a segregated holder or package so as to be in condition for the verifying operations that may be thereafter performed. Since the total card is ejected from the sheet guideway G, and since the new card C is advanced to punching position near the end of the operation of the unit U, the entire machine, at the end of a total operation stands in the same condition as it did prior to the total operation. In other words, the sequence of operation of the machine is not disturbed by the production of the total card, as will hereinafter become evident as the details of the structure and operation are described.

Figure 2:
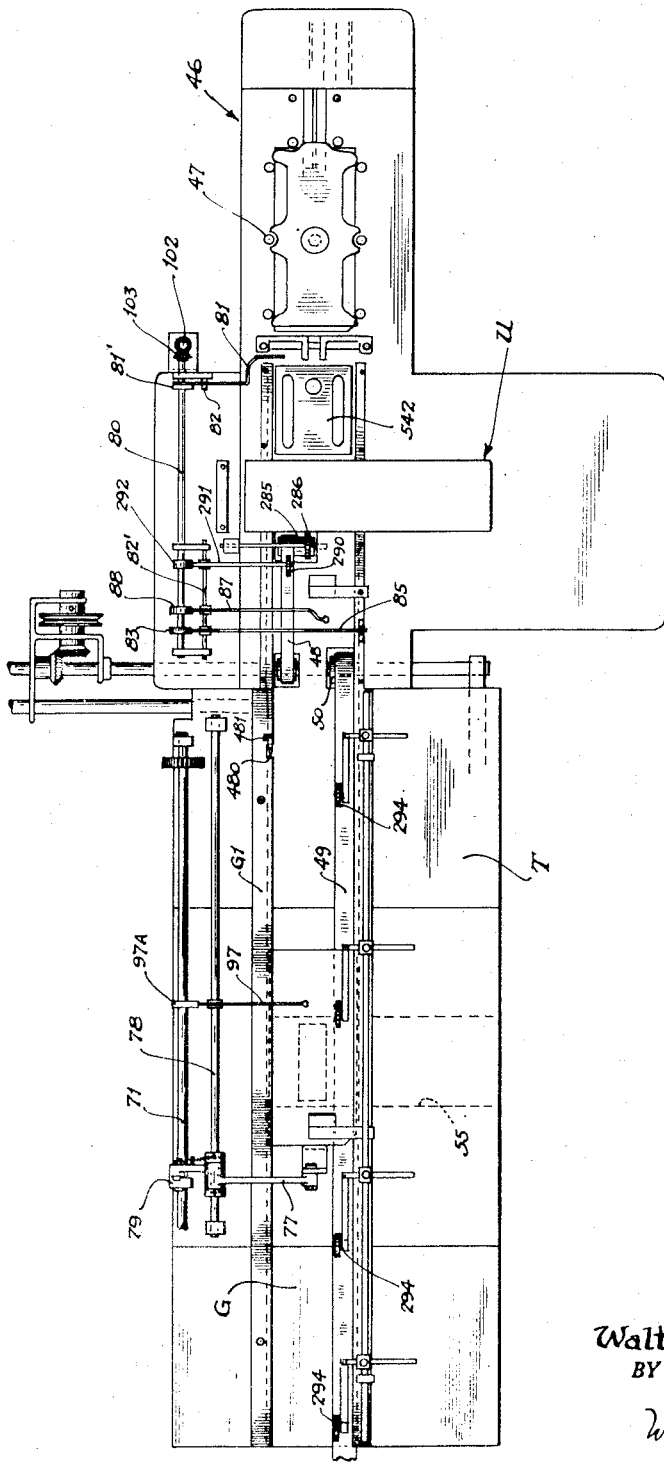
Fig. 2 is a fragmental plan view of the machine shown in Fig. 1.

The movements of each card C out of the hopper 47, and the movements of this card into and out of the punching station, are controlled by the adding and punching unit U, and in effecting such control of the card C, a secondary stop finger cam shaft 80 is provided along the rear side of the sheet guideway G adjacent to the punching station. This stop finger cam shaft 80 is arranged to control a safety detecting finger 81 which is pivotally mounted on a supporting shaft 82 so that the rear end of the stop finger 81 is disposed beneath a cam 81' on the shaft 80. When a card C is moved by the card feed means to a position beneath the finger 81, the card is sensed by the finger 81, and in the event that the card feed has failed, the absence of a card is detected and the machine is stopped, as will hereinafter be described. When a card is moved into contact with the belt 48 and is advanced along the card guideway G, the movement of the card is stopped by a stop finger 85 so as to accurately locate the card at punching position with the proper columns thereof aligned with the rows of punches that are provided in the punching unit. The stop finger 85 is also pivoted intermediate its ends on the supporting shaft 82 so that the rear end of the stop finger 85 is disposed beneath an operating cam 83 on the shaft 80 in a conventional manner. After a card has thus been advanced, it is important to determine whether or not this card has advanced to the desired punching position in engagement with the stop finger 85, and for this reason, a safety detecting finger 87 is pivoted on the supporting shaft 81 just to the right of the stop finger 85 as viewed in Fig. 2. The detecting finger 87 is operated by a cam 88 fixed on the cam shaft 80 and the finger 87 has its outer end extended downwardly in alignment with an opening 90 in the table top T. The detecting finger 87 is spring biased in a downward direction and when a card is not in position in engagement with the stop finger 85, the end of the detecting finger 87 moves through the opening 90 so as to close a normally open safety switch 95. Such closure of the safety switch 95 serves to stop the operation of the machine as will be hereinafter described in detail. In the operation of a machine of this character it is also important to determine whether or not a card is located at printing position before the operation of the printing means takes place, and another detecting finger 97 is pivotally mounted adjacent to and just ahead of printing position so as to be operated by a cam 97A mounted on the cam shaft 71. The detecting finger 97 as well as the detecting finger 81 are arranged, when a card is not detected thereby, to move downwardly through the table top of the machine so as to close switch means disposed in the path of such fingers. In the present instance the detecting finger 81 is arranged to operate a switch 98, while the detecting finger 97 is arranged to operate a switch 99, and the association of these switch with the control means of the machine will be described in detail hereinafter.

The stop finger cam shaft 80 is driven from the adding and punching unit U, and for this purpose, a horizontal shaft 100 is connected to the main shaft of the adding and punching unit so as to be driven in a one-to-one relationship with respect to the adding and punching unit. This horizontal shaft is connected by beveled gears 101 to a vertical shaft 102 which is in turn connected by beveled gears 103 to the cam shaft 80, and hence the cam shaft 80 is operated through one-revolution each time the adding and punching unit U is operated through a cycle. The rotative movement of the horizontal shaft 100 also serves to operate the card feed mechanism 46 through a crank 105 and a link 106 as will be described in detail hereinafter.

Figure 6:
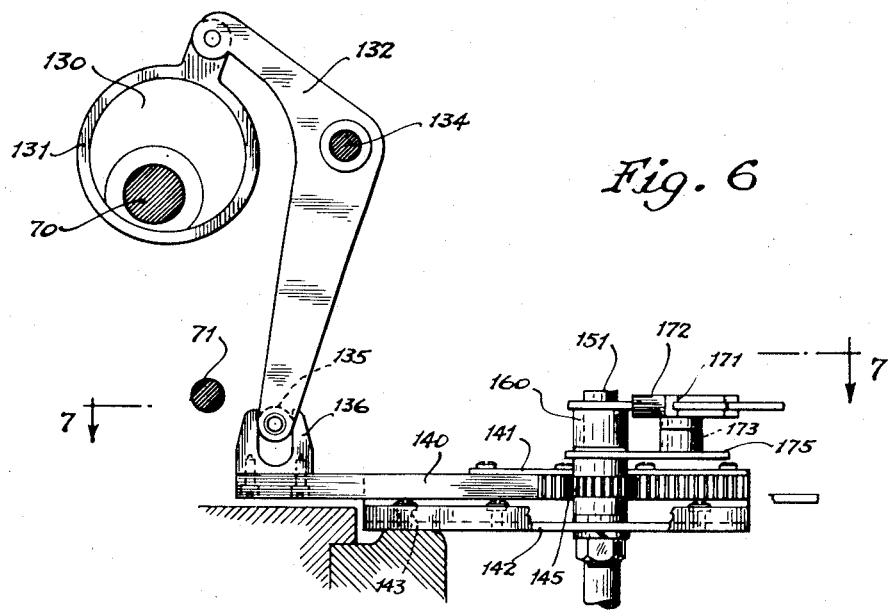
Fig. 6 is a vertical sectional view showing the manner in which the printing device advancing means and the manner of association thereof with the main cam shaft of the machine.
Figure 7:
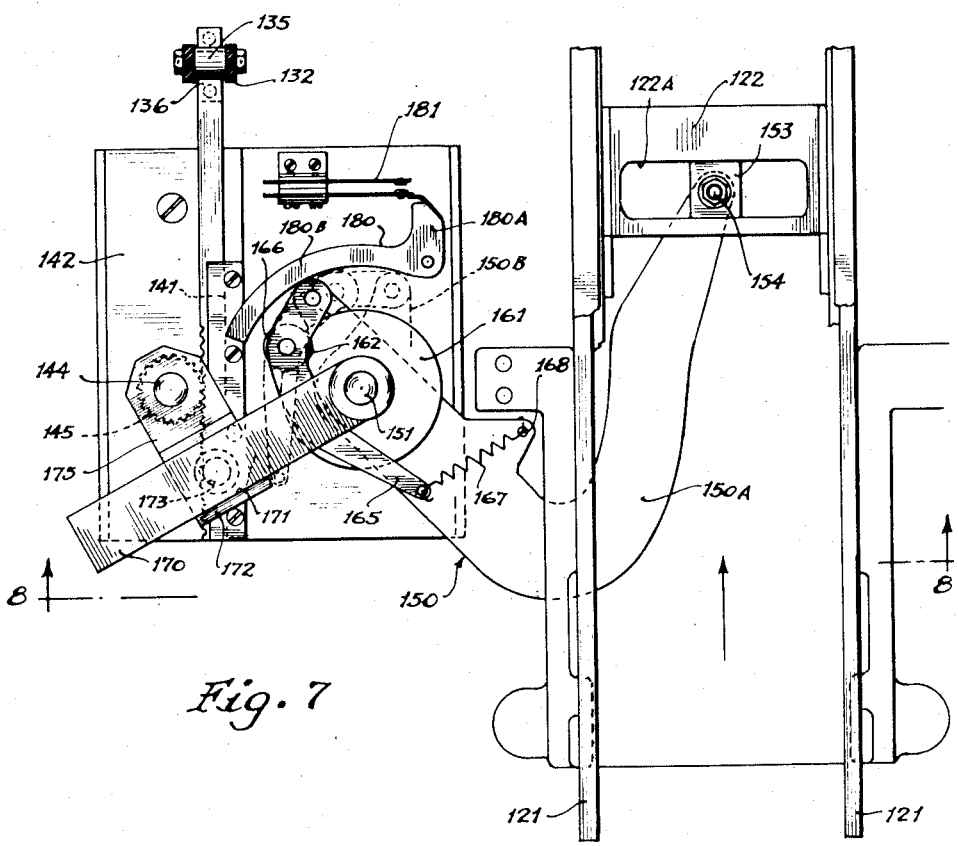
Fig. 7 is a fragmental plan sectional view taken substantially along the line 7—7 of Fig. 6.
Figure 8:
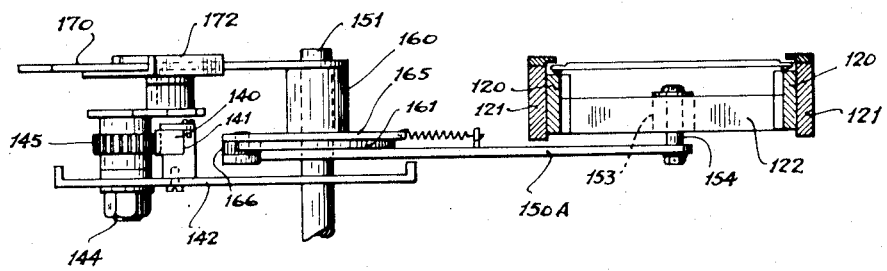
Fig. 8 is a sectional view taken substantially along the line 8—8 of Fig. 7.

The printing device advancing means whereby the printing and control devices D are advanced in a step-by-step manner along guideway 55 are driven from the main cam shaft 70 and the details of this advancing mechanism are illustrated in Figs. 6, 7 and 8 of the drawings. Thus, it will be noted in Fig. 8 of the drawings that spaced carrier bars 120 are mounted and guided for horizontal movement between the spaced horizontal rails 121 that afford the guideway 55, such carrier bars 120 being secured to and spaced apart by a bearing block 122. The carrier bars 120 have spaced pairs of spring elevated pawls 123 mounted thereon for engagement with the rear edges of the printing devices D in the course of forward movement of the carrier bars, and hence in the course of reciprocation of the carrier bars, the printing and control devices D will be advanced one by one and in a step-by-step manner from station to station along the printing device guideway 55.

In affording a drive for the carrier bars 120, an eccentric 130 is fixed upon the main cam shaft 70 and this eccentric has a yoke 131 associated therewith. The yoke 131 is connected to one end of a bell crank 132 that is pivoted intermediate its ends on a mounting stud 133 carried on a wall of a housing 134 that encloses the main cam shaft 70 and most of the mechanism associated therewith. The other arm of the bell crank 132 extends in a generally downward direction and has a roller 135 at its lower end whereby driving connection is established between the bell crank 132 and the mechanism that operates the carrier bars 130. Thus the roller 135 is embraced between the arms of an upstanding bracket 136 carried on a rack 140. The rack 140 is disposed in a horizontal position so as to extend in a direction disposed from front to rear of the machine, and the rack is guided in a horizontal guideway 141 provided on a mounting plate 142. The mounting plate is secured by screws 143 so as to extend rearwardly from the frame of the machine somewhat below the level of the table top T, and this plate also includes bearing means 144 on which a pinion 145 is mounted in engagement with the teeth of the rack 140, the pinion being rotatable upon a vertical axis. Thus in the course of rotation of the main cam shaft 70, the rack 140 will be reciprocated through a predetermined stroke, and in the course of such reciprocation, the pinion 145 will be oscillated back and fourth through a substantial range of movement. This oscillating movement of the pinion 145 is utilized to drive an operating lever 150 that is pivoted on a vertical mounting stud 151 carried on the mounting plate 142. The lever 150 has one arm 150A this is substantially L-shaped in form and this arm extends beneath the adjacent rail 121 so as to dispose the end of the arm 150A beneath the bearing block 122. The bearing block 122 has a slot 122A formed therein so as to be disposed transversely of the guideway 55, and a slide block 153 disposed in the slot 122A is connected by a pivot pin 154 to the end of the arm 150A. Thus in the course of an oscillating movement of the lever 150 about its pivot, the carrier bars 120 are moved through a reciprocating movement in the printing device guideway 55, and this oscillating movement is attained in the course of the oscillating movement of the pinion 145. Thus the stud 151 has a sleeve 160 mounted thereon and this sleeve 160 has an integral disc 161 provided at the lower end thereof. The disc 161 has an arcuate slot or notch 162 formed in the edge thereof, and this slot 162 is utilized in affording a releasable connection between the disc 161 and the arm or lever 150. Thus the lever 150 has another arm 150B extended from the pivotal axis thereof and this arm has one end of a latch lever 165 pivoted thereon. Intermediate its ends, the latch lever 165 has a roller 166 mounted thereon, and this roller is adapted to be seated in the arcuate slot or notch 162 so as to afford a driving connection between the disc 161 and the arm or lever 150. The roller 166 is normally maintained in the arcuate notch 162 by a spring 167 that is extended between the free end of the latch lever 165 and an anchoring pin 168 carried on the lever 150, and thus the latch lever 165 and the associated mechanism constitute an overload release in the drive for the carrier bars 120.

The other or upper end of the sleeve 160 has an arm 170 rigidly extended in a radial relation therefrom, and this arm is extended slidably through a guide slot 171 in a bearing block 172 and this bearing block 172 is pivoted on a vertical axis 173 on an arm 175. The arm 175 is extended radially and in a rigid relation from the upper end portion of the pinion 145 so that when the pinion 145 is oscillated, the arm 175 will move through a substantial arcuate range, and in the course of such oscillating movement of the arm 175, the bearing block 172 and the arm 170 act as means in the nature of a Scotch yoke to impart a smaller arcuate oscillating movement to the arm 150, and this movement of the arm 150 is of such an extent that the desired reciprocating movements are imparted to the carrier bars 120.

When the overload release mechanism of the printing device feed is released, it is desirable that the machine be immediately stopped, and in attaining this automatic stopping of the machine, means are associated with the latch lever 165 for closing an electrical switch means. Thus a switch operating arm 180 is pivoted on a vertical axis on the plate 142 adjacent to the path of movement of the end of the arm 150B, and one end 180A of the lever 180 has a cam surface thereon associated with a switch 181 so that, by rocking movement of the lever 180, the switch 181 may be closed. The switch 181 is of the spring blade type so as to normally assume an open position and when the switch is in this open position it maintains the switch operating lever in such a position that the other arm 180B is concentric with the normal path of movement of the roller 166. The other arm 180B of the switch operating lever 180 is of course arcuate in form, and it extends for a sufficient distance about a concentric with the vertical pivot of the lever 150 so that some portion of the arm 180B will be at all times be disposed opposite the roller 166. So long as the roller 166 is seated in the notch 162, the roller 166 is out of contact with the arm 180B, but when an overload condition in the printing device advancing means causes release of the latch lever 165, the outward radial movement of the roller 166 engages this roller with the arm 180B and causes the switch operating lever 180 to be rocked in a clockwise direction, Fig. 7, and this causes the switch 181 to be closed. Such switch closure is effective to stop the operation of the machine 20 as will hereinafter be described.

Figure 10:
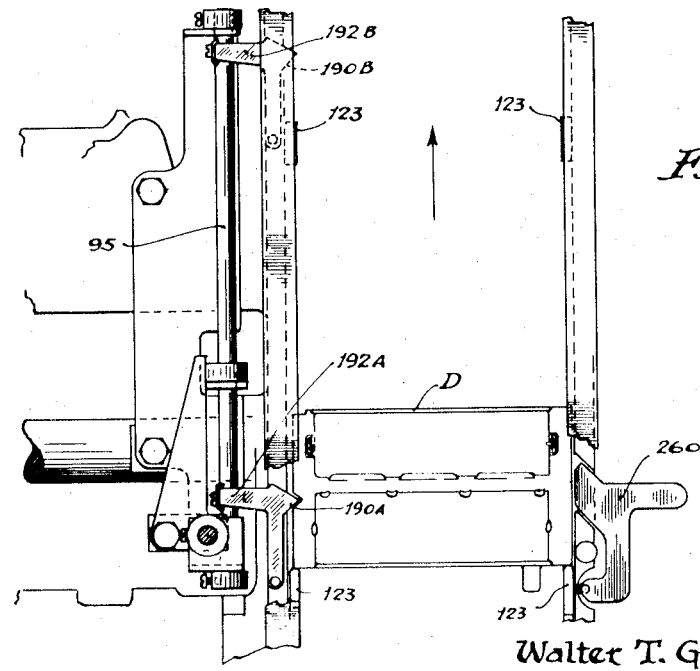
Fig. 10 is a fragmental plan sectional view taken substantially along the line 10—10 of Fig. 9.

After an advancing operation of the carrier bars 120 has been completed so as to move printing devices into the sensing station and the printing station, means are rendered effective to accurately locate these printing devices at such stations. In accomplishing such accurate location, the printing devices D are each provided with locating surfaces such as those afforded by a notch 185 formed in an end edge of the frame 30 of each printing device. Such notches 185 are adapted to be engaged by positioning pawls 190A and 190B that are mounted on the left-hand rail 121 as viewed in Fig. 10 at points opposite the sensing and printing stations. The pawl 190A is pivoted at 191A opposite the sensing station, and the positioning point of the pawl 190A is disposed a substantial distance forwardly of the pivot 191A. The pawl 190A has a finger portion 192A extended outwardly from the left-hand side of the rail 121 and the desired inward or positioning movement of the pawl 190A is attained by application of a resilient force to this finger portion 192A. The structure and mounting of the pawl 190B is substantially the same as the just described structure of the pawl 190A, the pawl 190B being disposed at the left-hand side of the printing position as viewed in Fig. 10. A common means is provided for actuating two pawls 190A and 190B and such means includes a horizontal rock shaft 195 supported in a bracket 196 near the lower edge of the left-hand rail 121. The rock shaft 195 has a pair of spring arms 197A and 197B fixed thereon so as to extend upwardly and into engagement with the ends of the fingers 192A and 192B respectively of the two pawls, and the two pawls are actuated in unison by rocking movement of the shaft 195. Such rocking movement is effected by a face cam 200 that is mounted on the main cam shaft 70 of the machine. The face cam 200 is arranged to operate upon an arm 201 that has a roller 202 fixed thereon so as to engage the face of the cam 200. The arm 201 is mounted on a vertical shaft 205 that is mounted in bearings 206, and near its lower end the shaft 205 has an arm 207 extended therefrom. The arm 207 is arranged to bear against an upwardly extended arm 208 fixed on the rock shaft 195, and this serves to form an operative connection between the vertical shaft 205 and the horizontal rock shaft 195. Thus when the vertical shaft 205 is rocked by the action of the cam 200, a similar rocking movement is imparted to the rock shaft 195 and through the action of the spring arms 197A and 197B, such rocking movement is effective to produce the desired operation of the position pawls 190A and 190B. The pawls 190A and 190B are thus yieldingly urged toward their effective positions after the printing devices have reached the sensing and printing stations respectively, and are released for movement to their ineffective positions after the sensing and printing operations have been completed and prior to the time when such printing devices are to be again advanced along the printing device guideway 55.

Figure 9:
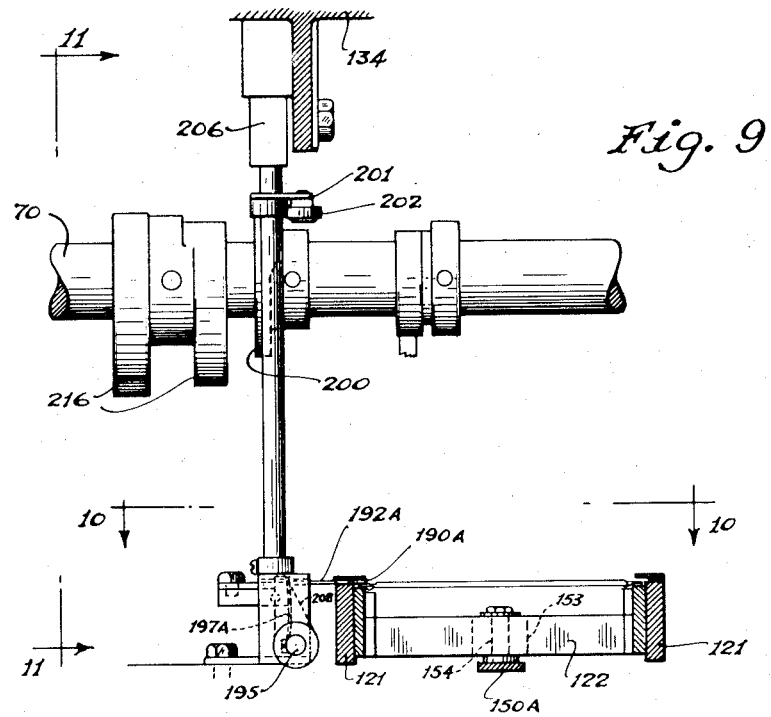
Fig. 9 is a view taken in vertical section and illustrating the manner in which the printing device positioning pawls are operated from the main cam shaft.

The platen P that is utilized in the present machine is of substantially the same character as the platen illustrated in the aforesaid Gollwitzer Patent No. 2,002,772, with the exception, however, that the present platen does not make use of receding platen faces or sections. Thus the platen P is mounted on the forward end of a rocking frame 215, this frame being operatively associated with cams 216, Fig. 9, on the main cam shaft 70 in substantially the same manner as described in the aforesaid Gollwitzer patent. The arrangement is such that the platen P is operated through its downward or printing stroke during the first half of the cycle of operation of the machine, and the advancing movements of the printing devices take place during the last half of the machine cycle, as will hereinafter be described in greater detail in connection with the decription of the operation of the machine.

The sensing head S, Figs. 12 to 15 and 17, is in the present case mounted on the rails 121 by means of a pair of supporting arms 220 that are pivoted on the two rails 121 and which are connected to the sensing head so as to support the sensing head on the free ends of the arms 220. The downward or sensing movement of the sensing head S is effected in timed relation to the operation of the carrier bars 120 by means that are driven from the main cam shaft 70, and such means are shown in detail in Figs. 12 and 17 of the drawings. Thus it will be evident that a link 221 is pivoted to the sensing head S so as to extend upwardly therefrom, and the upper end of the link 221 is pivoted to the rear end of a lever arm 222. The lever arm 222 extends forwardly and beneath the main cam shaft 70, and at its forward end the lever arm 222 is supported on a fixed pivot 223 carried on a part of the frame or housing 134. Midway between its ends, the arm 222 has a roller 224 mounted thereon and this roller is arranged to ride against the lower edge of a cam 225 that is fixed on the main cam shaft 70. A spring 226 acting on one of the arms 220 of the sensing head S and a spring 226 acting on the lever 222 serve to maintain the cam roller 224 in abutment with the actuating surface of the cam 225, and this cam is so formed that the sensing head S is moved downwardly through a sensing stroke quite early in the first half of the cycle of operation of the machine 20, as will hereinafter be described in greater detail.

Figure 14:
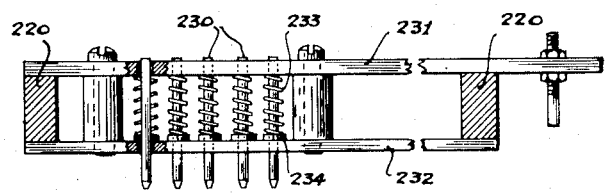
Fig. 14 is a sectional view taken substantially along the line 14—14 of Fig. 13.
Figure 15:
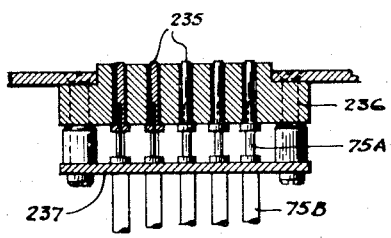
Fig. 15 is a plan view of the portion of the sensing means that is located in the printing device guideway.

When the sensing head S is moved downwardly through its sensing stroke it is effective to selectively actuate the Bowden cables 75 in accordance with the perforations 40 that are detected in the frame of the printing device then at the sensing station, and for this reason the sensing head S is constructed to afford a pin box arrangement having a sensing pin 230 for each of the index points at which a perforation 40 may be formed. The sensing pins 230 are mounted and guided in vertical spaced plates 231 and 232 that form part of the sensing head S, and springs 233, Fig. 14, are provided in surrounding relation to the respective pins 230 so as to force these pins yieldingly into their downwardly projecting relation as determined by stop shoulders 234 formed on the respective pins. Thus all of the sensing pins 230 normally project downwardly below the lower plate 232 of the sensing head S, and in the course of downward or sensing movement of the sensing head, these pins are moved into engagement with the control area 38 at the different index points at which perforations 40 may appear in this area. When a sensing pin 230 encounters an imperforate area of the printing and control device, the pin will remain in the same vertical location as the downward or sensing movement of the sensing head S progresses and during such relative movement the associated spring 233 will be compressed. When, however, a pin 230 encounters a perforation 40 in the printing device D, such sensing pin 230 will move through this perforation and into engagement with an opposed transmitting plunger 235 so as to impart downward movement to such plunger. One such transmitting plunger is provided for each of the index positions, and thus the location and arrangement of such transmitting plungers 235 corresponds with the location and arrangement of the sensing pins 230. Such plungers 235 are mounted for vertical movement in a mounting block 236 disposed in the printing device guideway so as to lie beneath the control area 38 of a printing device when such printing device is disposed at sensing position. Each such transmitting plunger is operatively connected to one end of a related Bowden wire 75A so that downward movement of a particular plunger 235 produces corresponding movement of the associated Bowden wire 75A. It will be observed that the sheaths 75B of the several Bowden wires are anchored in a fixed relation on an anchoring plate 237 that is mounted in a fixed position beneath the mounting block 236. The actuation of the Bowden wires 75A in any particular sensing operation of the sensing head S therefore corresponds with the perforations 40 detected in the printing device then at sensing station, and such selective actuation of the Bowden wires is effective to control the set up of adding and punching unit U in a manner that will be described hereinafter in full detail.

Figure 16:
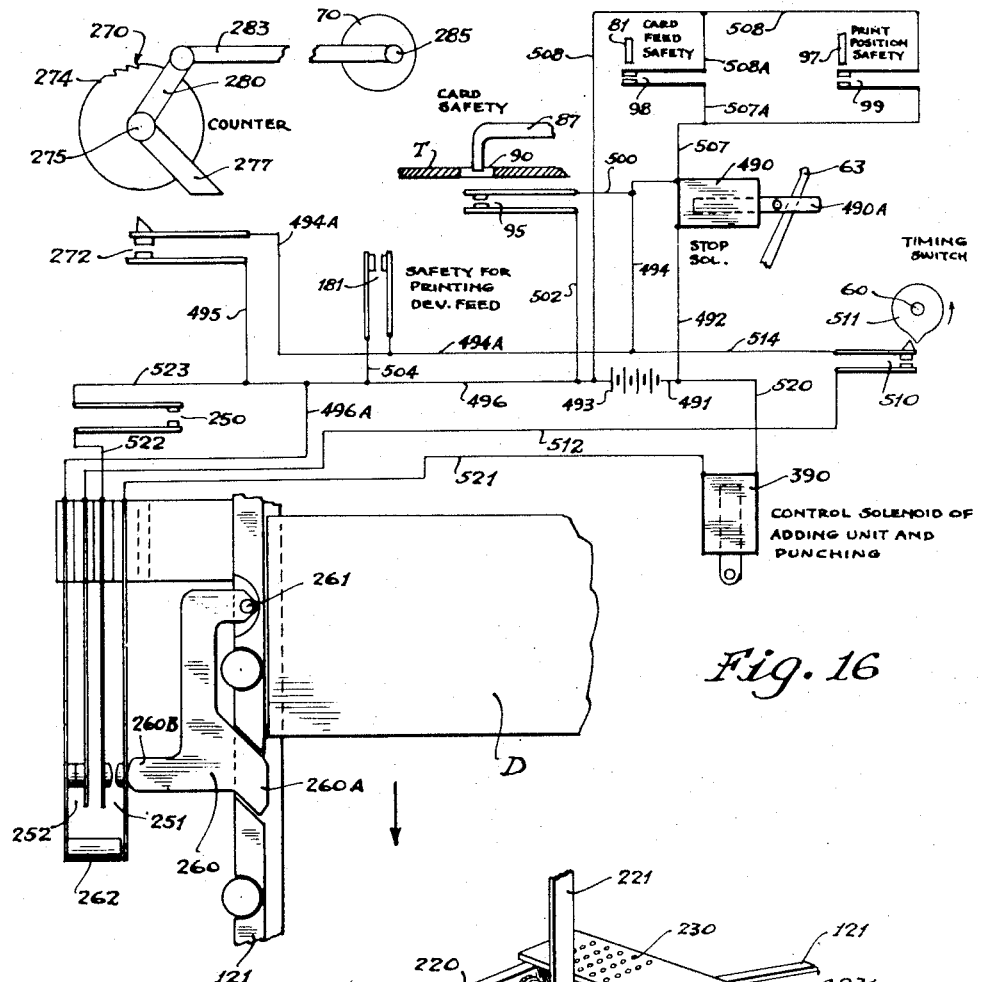
Fig. 16 is a schematic wiring diagram illustrating the manner in which the elements of the machine are associated.
Figure 17:
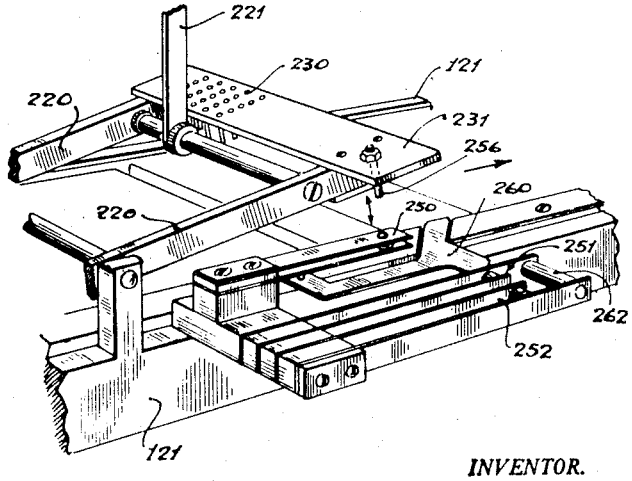
Fig. 17 is a fragmental perspective view illustrating the switch mechanisms that are associated with the sensing head.

When the sensing head S is thus operated to produce selective actuation of the Bowden wires 75A, it is desirable to determine whether or not a printing and control device is in proper position at the sensing station, for it will be evident that if such a printing device were not at sensing station, the actuation of the several Bowden wires 75A would produce an incorrect and meaningless set up of the adding and punching unit, and means are therefore provided at the sensing station for determining that the sensing operation has been completed and for determining whether or not a printing and control device is in proper position at the sensing station. Thus as shown in Figs. 16 and 17 of the drawings, a plurality of switches 250, 251 and 252 are mounted on the right-hand rail 121 adjacent to the sensing station, the switch 250 being arranged to be operated by the vertical movements of the sensing head S while the two switches 251 and 252 are arranged to be operated by the printing and control devices as such devices are moved into and out of the sensing station. All of the switches 250, 251 and 252 are of the spring blade type, and these switches are supported on a mounting bracket 255 carried on the side of the left-hand rail 121. The switch 250 is of the normally open type and is arranged so as to lie in the path of an adjustable actuating screw 256 carried on a projecting end cf the plate 231 of the sensing head S. Thus when the downward or sensing movement of the sensing head S is completed, the screw 256 engages the upper blade of the switch 250 so as to close this switch, and closure of the switch 250 is a condition precedent to initiation of the cycle of operation of the adding and punching unit U. The switches 251 and 252 are mounted on the bracket 255 so that they may be closed by a force applied laterally and in a horizontal direction with respect to the printing device guideway 55. The switch 251 is of the normally open type, while the switch 252 is of the normally closed type, and means are associated with these switches for closing the switch 251 and opening the switch 252 when a printing device is moved into the proper position at the sensing station. Thus an operating pawl 260 is pivoted at 261 on the right-hand rail 121, and the pawl 260 has a pointed operating finger extended into the printing device guideway so that this finger will be engaged by a printing device as such printing device advances into sensing position. This engagement of a printing device with the pointed operating finger 260A serves to cam the operating pawl in an outward or clockwise direction as viewed in Fig. 10, and the operating finger 260A is thereby moved out of the printing device guideway. As the pawl 260 thus moves in an outward direction, a transmitting finger 260B of the pawl is effective to cause the desired operation of the switches 251 and 252. In the present case, the transmitting finger 260B bears upon the adjacent blade of the normally open switch 251, thereby to impart closing movement to this blade of the switch, and an insulating block 262 interposed between the actuated blade of the switch 251 and the remote blade of the switch 252 serves to impart a corresponding movement to the engaged blade of the switch 252. Thus when the pawl 260 is moved in a clockwise direction by movement of a printing device into sensing station, the switch 251 is closed and the switch 252 is opened, and such operation of the switches 251 and 252 is utilized in attaining proper timed operation of the machine as will hereinafter be described in detail.

It has been pointed out hereinbefore that the cards or checks C are prepared in the present machine in relatively small groups, and for the purpose of controlling the operation of the machine to attain this result, counting means are provided for counting the number of checks that are produced by the machine. Thus as shown in Figs. 1 and 16 of the drawings, a counting device 270 in the nature of a ratchet is mounted on one end of the frame 134 of the machine. This counting means is in the present instance of the same general character as the ratchet type counter shown in my copending application Serial No. 578,507, filed February 17, 1945, and is carried on a mounting bracket that is secured on the frame 134 of the machine in the manner described in said application, and the counting device is arranged to close a normally open switch 272, Fig. 16, when a predetermined number of checks have been produced by the machine. The switch 272 is mounted on the lower or horizontal arm of the mounting bracket, while the ratchet mechanism is mounted on the vertical portion of the bracket. Such ratchet mechanism comprises a ratchet wheel 274 mounted on a stud 275 and having spring associated therewith so as to prevent retrograde movement of the ratchet wheel 274. The ratchet wheel 274 has a cam arm 277 associated therewith and this cam arm is arranged to engage and close the switch 272 in the last cycle of machine operation that is to be performed in respect to a particular group of checks. The ratchet wheel 274 is operated by a rocking arm 280 mounted on the stud 275 and having the usual spring pressed pawl thereon for engagement with the teeth of the ratchet wheel 274. The rocking arm 280 is arranged to be rocked back and forth in each cycle of operation of the machine 20, and for this purpose an operating link 283, having one of its ends pivoted at 284 on the rocking arm 280, is pivoted at its other end on an eccentric operating stud 285 mounted on the end of the main cam shaft 70. Thus the operating or rocking arm 280 is actuated in each cycle of operation of the main cam shaft 70, and when the cam shaft 70 has completed the desired number of cycles of rotation, the counter is effective to close the switch 272 and thereby cause the machine to be stopped at the end of that cycle in a manner that will hereinafter be described in detail. It should be pointed out in this connection however that the closure of the switch 272 is momentary in character, and at the end of a cycle of machine operation in which such closure has occurred, the switch 272 will be open.

As will be described in detail hereinafter, the card feed mechanism 46 is operated in timed relation to the operation of the unit U, and as will be evident in the timing charts, the leading edge of the new card is brought into position over the belt 48 just after the preceding card has been discharged from the punching position. This leading edge of the new card also engages the exposed surface of a smooth steel roller 285 that is disposed in the sheet guideway beside the right-hand end of the belt 48, Fig. 2, this roller 285 being connected to and driven by the pulley or roller upon which the right-hand end of the belt 48 is supported, and hence the roller 285 is constantly driven at the same peripheral speed as the belt 48. Above the roller 285 a pressure roller 286 is resiliently mounted so as to bear downwardly with a predetermined yielding force, and hence the movement of the leading edge of the card into the bight between the rollers 285 and 286 results in rapid withdrawal and advancing of the card into contact with the stop finger 85 which is by this time in its lower or effective position. The location of the rollers 285 and 286 is such that when the card is in punching position with its leading edge in contact with the finger 85, the rear or trailing portion of the card will still be located between the rollers 285 and 286, and hence these rollers serve to maintain a constant forward driving force on the card to hold the same in contact with the stop finger 85. The detecting finger 87 operates, of course, soon after the card reaches the punching position.

After the punching operation has been performed in the next cycle of machine operation, the constant force applied by the rollers 285 and 286 is augmented by a roller 290 that is carried on a lever 291. The lever 291 is pivoted on the shaft 82', and has its rear end associated with a cam 292 fixed on the cam shaft 80 so as to lower the roller 290 at the time the stop finger 85 is raised. The lever 291 is spring biased so as to move the roller 290 downwardly with a considerable force, thereby to establish good frictional contact between the card and the belt 48. The card is thus moved quickly past the raised stop finger 85 and out of punching position, and in such movement the card moves onto the belt 49 whereby further advancing movements of the card are effected, the card being held in contact with the belt 49 by resiliently pressed skid rollers 294.

It has been pointed out that the card feed mechanism 46 is operated by the punching and adding unit U each time the unit U is operated, and this connection includes the crank 105 and the link 106 which are operatively connected to a transverse shaft 300 mounted in the frame of the card feed mechanism substantially beneath the hopper 47 thereof. The transverse shaft 300 has a narrow drum 301 fixed thereon, and the frame of the card feed means is formed to afford a stationary housing 302 that surrounds the drum 301 in a relatively snug relationship so as to afford a guide channel 303 about the periphery of the drum. Within the guide channel 303 a flexible wire or band 305 has one of its ends fixed as at 306 to the periphery of the drum, and as viewed in Fig. 20 of the drawings, the band extends from the fastening 306 in a counterclockwise direction around the drum and within the channel 303. At the other end of the band 305, a card engaging slide 307 is secured, and this slide 307 is slidably guided in a horizontal channel 308 so as to be capable of movement longitudinally of and beneath the hopper 47 and toward the adjacent end of the sheet guideway G. At its forward or left-hand end as viewed in Fig. 21 of the drawings, the slide 307 has a hardened steel block 310 mounted on a pawl 311 that is urged upwardly by a spring 311', and the block 310 defines a card engaging shoulder 310' of such a form and configuration as to engage the end edge of the lowermost card in the hopper 47 when the slide 307 is moved from right to left in its card separating and advancing stroke. In such a card advancing stroke, the lowermost card is moved out of the hopper 47 for a sufficient distance to locate the forward portion of the card in an operative relationship with respect to the feed belt 48 and the rollers 285 and 286 and when this relationship is established, the belt 48 and the rollers 285 and 286 continue the advancing movement of the card until the leading edge of the card engages the stop finger 85.

The reciprocating movements of the card feed slide 307 are imparted thereto by rocking or oscillating movements of the drum 301, and such oscillating movements are imparted to the drum by the link 106. In the form herein shown, the connection of the link 106 with the transverse shaft 300 is arranged in such a way as to afford an overload release, and for this reason, the link 106 has a rack portion 106A formed thereon that is engaged with a pinion 312 that is loosely mounted on the end of the shaft 300. The pinion 312 has a disc 313 fixed thereto and this disc has a notch 314 of arcuate form in the edge thereof for engagement by a releasable connecting pawl or lever 315. The lever 315 is pivoted at one of its ends on a plate 316 that is fixed to the shaft 300 so as to lie immediately adjacent to the disc 313, and the lever has a roller 317 thereon that is adapted to engage the notch 314 to provide a driving connection between the disc 313 and the plate 316. The lever 315 is biased by a spring 318 in such a direction as to tend to maintain the roller 317 in the notch 314, but in the event of an overload in the card feed mechanism, the force of the spring 318 will be overcome and the driving connection will be released. After a releasing operation of the overload release mechanism, it is essential that a convenient means be afforded for reestablishing the desired driving connection, and for this purpose, the shaft 300 is extended rearwardly and has a hand wheel 319 fixed thereon, and when the lever 315 has been released, the desired connection may be reestablished merely by turning the hand wheel 319 until the roller 317 again is in a matching relationship with respect to the notch 314. In Fig. 18 of the drawings the crank 105 is shown in the position that it occupies when the adding and punching unit is about one-half way through its cycle, and hence the card feed slide 307 is in its fully retracted position.

The punching and accumulating unit U as embodied in the present machine is so arranged that the accumulating means thereof are constructed substantially as disclosed in my copending application Serial No. 416,745, filed October 27, 1941, now Patent No. 2,427,049. Thus as shown in Figs. 24 to 32 of the drawings, the unit U includes a pair of vertical side plates 340 arranged in spaced relationship and so disposed beneath the table top T that a punching mechanism on the unit U may extend above the table top T. The punching mechanism is in the present case supported by a horizontal mounting plate 342 extended between the side plate 340 near the upper edges thereof and held in position by screws 342A. On the top of the mounting plate 342 a die plate 343 and a guide plate 344 are mounted one above the other so as to be held in place on the mounting plate 342 by screws 345. The lower face of the guide plate 344 is recessed upwardly to afford a throat 346, Fig. 23, that is disposed in aligned relation to the guideway G so that the cards C are moved into and through the throat 346 in the course of advancing movement of the card feed slide 307. The arrangement of the stop finger 85 is such that when a card is engaged with the stop finger, the columns 24 of the card are disposed in proper registered relationship with respect to corresponding columns of punches 348 mounted in the guide plate 344. The punches 348 are rectangular in cross section, and are disposed in complemental vertical guide openings in the guide plate 344 so as to be arranged in a series of rows and columns that correspond to the index positions at which perforations 25 may be formed in a card C. Each of the punches 348 is arranged opposite a complemental die opening 350 in the die plate 343, and these openings 350 open into discharge openings 351 and 352 formed in the plates 343 and 342 so that punchings or slugs may drop into a discharge chute 354.

A movable punching assembly is mounted and guided in the present instance by means associated with the mounting plate 342, and for this purpose a plurality of vertically disposed rods 355 are extended slidably through the mounting plate 342 adjacent the four corners thereof. At their lower ends, the rods 355 are fixed to a plate 356 so that vertical reciprocating movements may be imparted to the rods 355 in unison by application of the required forces to the plate 356 as will be hereinafter described. At their upper ends, the rods 355 are connected in a fixed relation to a relatively heavy and flat plate 357 that constitutes the operating head of the punching mechanism.

The head or plate 357 is disposed in an upwardly spaced relation with respect to a horizontal stripper plate 360 that is mounted in fixed position on the rods 355 for movement therewith, and this stripper plate 360 has openings therein through which the punches 348 are extended so that the heads of the punches are normally rested on the upper face of the stripper plate 360. The head or plate 357 constitutes the operating means for the punches 348, and the punches 348 in any column thereof may be selectively operated by first setting a series of interposers 365 and then actuating the punching head 357. The interposers 365 have heads 366 formed thereon that are relatively narrow and which ride upon the upper surfaces of the heads of the punches. The upper ends of the heads 366 are arranged to ride in guide channels 367 formed between vertically positioned guide plates 368 that are secured on the lower surface of the head 357. It will be observed that one interposer is provided for each column of punches so that the punching mechanism may be set to punch one perforation 25 in each column 24 of the card. When the interposers 365 have been set so as to represent the desired numbers or digits, the punch head 357 is moved downwardly by downward movement of the lower plate 356 and the connecting rods 355, the downward force that is necessary in this regard being applied to the lower plate 356 as will hereinafter be described. In the course of downward movement of the head 357 the interposers are similarly moved in a downward direction and the punches 348 with which such interposers are aligned are positively actuated through a punching operation. In this regard it will be noted that the stripper plate 360 also moves downwardly as the head 357 is operated, and hence all of the punches 348 may move down until they contact the supporting surface that will be afforded by the card that is in punching position. When this occurs, a downward movement of all of the punches will be terminated except where such punches are in alignment with the heads 366 of the respective interposers 365. In accordance with the setting of such interposers 365, the punches 348 produce perforations in the card C that is then at punching position, and when the movement of the punching head 357 is reversed, the upward movement of the stripper plate 360 will cause the actuated punches to be withdrawn from the perforations that have been made thereby, and all of the punches will be raised to their normal elevated positions so as to free the card C for movement out of punching position.

In attaining the desired movement of the punch head 357, the adding unit is operatively associated with the punching head through the medium of the main cam shaft 375 thereof. The main cam shaft 375 is extended through the two side frames or plates 340 of the adding unit, and outside of one of the side plates 340, the shaft 375 has a one-revolution clutch 380 operatively associated therewith. This one-revolution clutch may be of the general character disclosed in my Patent No. 2,265,133, patented December 9, 1941. As herein shown the one-revolution clutch 380 has a driven member in the form of a gear 381 freely mounted for rotation on the main cam shaft 375 and adapted to be drivingly connected to the cam shaft upon engagement of the one-revolution clutch 380. The gear 381 is constantly rotated by means including a pinion 382 and a drive shaft 383 upon which it is mounted, and this drive shaft is constantly operated by means including a pulley 384 and a drive belt that is extended from one of the constantly operating shafts of the machine 20. The one-revolution clutch 380 is adapted to be released for engagement by means including a solenoid 390 that is arranged when energized to momentarily release the stop lever of the one-revolution clutch so as to start the clutch through its one-revolution driving cycle.

When the main cam shaft 375 is operated through a cycle of rotation by reason of the closure of the clutch 380, the punching head 357 is moved downwardly and then upwardly at the proper time in the machine cycle, and as will hereinafter be apparent, such punching operation of the punching head 357 takes place after the interposers 365 have been set in accordance with the perforations 40 detected by the sensing head S in the printing device at sensing station. The desired actuation of the punching head 352 is in the present case attained by a pair of cams 391 and 392 fixed upon the main cam shaft 375 of the unit U, there being a transmitting plate 393 connected in a central relationship to the lower face of the lower plate 356 so as to extend downwardly into position between the two cams 391 and 392. The plate 393 has a laterally projecting roller 394 thereon that is arranged to engage the upper surface of the cam 392 while a similar roller 395 is extended therefrom so as to engage with the lower edge of the cam 391. The form of the cams 391 and 392 is such that the punching head 357 is held in its upper position until all of the interposers 365 have been set, and a leading surface on the cam 391 then engages the lower roller 395 so as to pull the punching head 357 through its downward or punching stroke. Upon completion of such punching stroke, a leading surface on the cam 392 is effective upon the upper roller 394 to impart upward or stripping movement to the punch head 357.

It has been pointed out that all of the punches 355 are controlled by the setting of interposers, one of which is provided for each column of punches. Certain of the interposers are manually set as will hereinafter be described, while at least one other group of interposers is set under control of the sensing means. In attaining such setting of the interposers, the adding unit is provided with a plurality of slides 400 that are guided for horizontal movement on guide rods 401. The slides 400 are normally urged in a left-hand direction by individual spring means 402 and are restored to what may be termed their zero positions by a restoring bail 403 that is operated by cam means on the cam shaft 375 in substantially the manner described in my aforesaid copending application Serial No. 416,745. The left-hand or set up movement of the slides 400 in a normal cycle of operation of the machine is controlled by the operation of set up means 404 that are operated by the Bowden cables 75, and in the course of set up movement and the restoring movement of the slides 400, the differential movements of the several slides 400 are utilized to set up the interposers 365 and also to enter the sensed numerical amounts into an accumulator AC-1 that serves to accumulate the group totals of the amounts entered upon the cards of a group. Another accumulator AC-2 is also provided in the present machine and this accumulator serves to afford a grand total of the amounts included in the several groups that may constitute a complete run of the machine. Since the manner of mounting and actuation of the accumulators AC-1 and AC-2 is fully shown in my aforesaid copending application Serial No. 416,745, such accumulators are herein shown in diagrammatic association with the slides 400 and the control mechanism of the unit.

Figure 23:
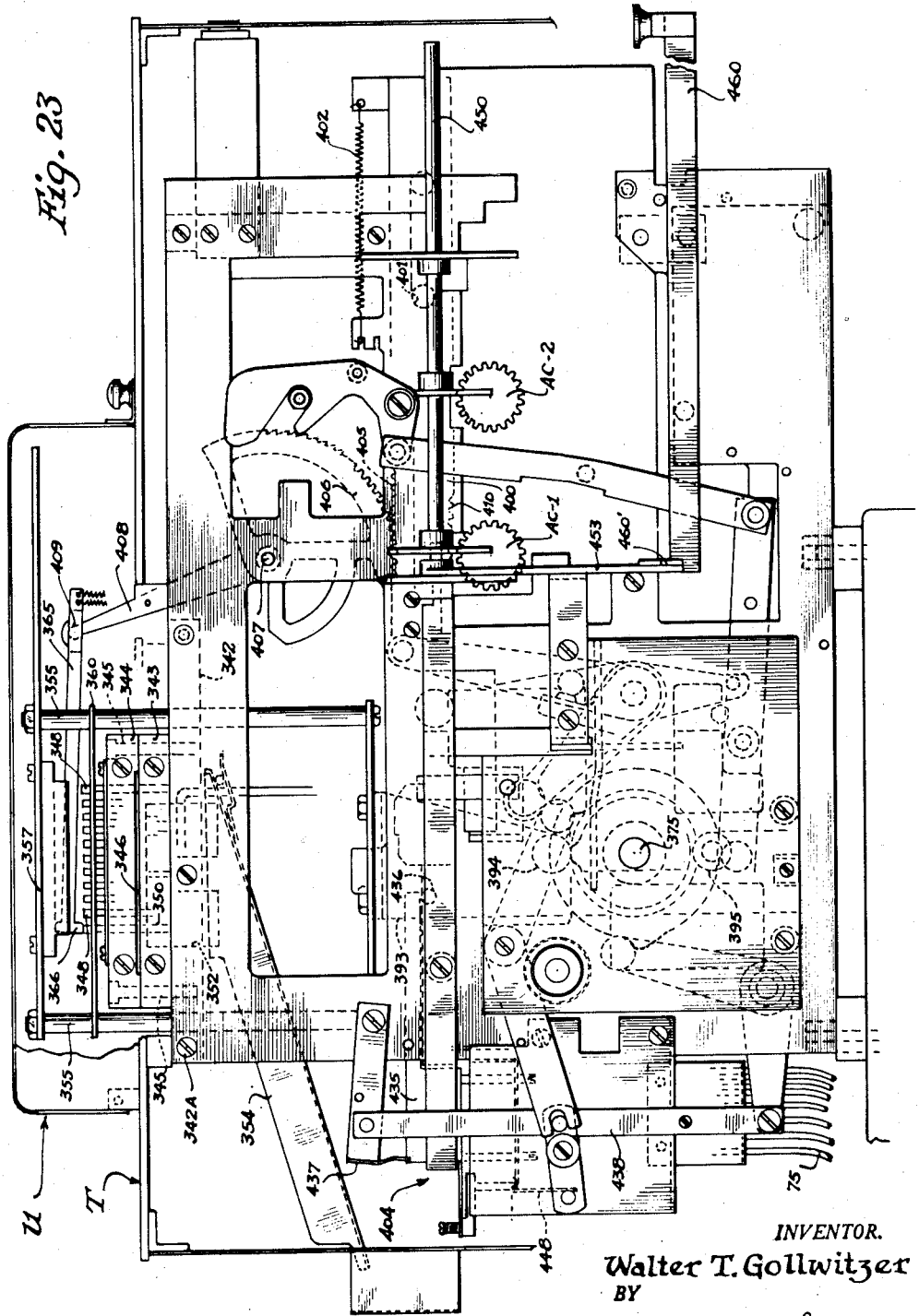
Fig. 23 is a vertical sectional view showing one side of the punching and accumulating unit.

When the slides 400 are moved to the left in the course of a set up operation of the unit U, such movement is transmitted to the interposers 365 so that the setting of the slides in the several orders of the accumulator mechanism will produce a corresponding setting of the interposers 365 in the related columns of the punch. In attaining this result, each of the slides 400 has a rack 405 formed along its upper edge, and a plurality of segments 406 are mounted on a shaft 407 so that one of the segments 406 will be engaged with each one of the racks 405. It will be recalled that the slides 400 are shown in Fig. 23 of the drawings in their zero positions, so that as the slides are moved to the left they will move successively into the "1" position and then through the various digital positions up to "9," and the corresponding rocking movements of the segments 406 are transmitted to the related interposers 356 by arms 408, one of which is extended upwardly from each of the segments 406. At its upper end, each of the arms 408 is connected by a pivotal joint 409 to the related one of the interposers 365, it being noted that such connection is effected at a substantial distance from the head 366 of the interposer so that the interposer will be maintained in the proper relationship despite the arcuate movement of the pivotal connection 409. After the interposers have been set as aforesaid, the punching mechanism is in condition for performance of the punching operation, and after the desired perforations have been formed and the punching head 357 has been returned to its upper position, the slides 400 are restored in a right-hand direction to their zero positions of Fig. 23.

In the course of the restoring movement of the slides 400 in a normal adding cycle, the digital amounts that have been represented by the set up positions of the slides 400 are entered into the accumulator wheels of the accumulator AC-1 as described in my aforesaid copending application, and hence this accumulator is moved upwardly into operative engagement with the slides 400 prior to the initiation of the restoring movement of the slides. Thus it will be noted that each of the slides 400 has a relatively long rack 410 formed on the lower edge thereof so that the related accumulator wheels of either of the accumulators AC-1 or AC-2 may be engaged with these racks when operation of the accumulator wheels is desired. In the normal operations wherein the checks C are being prepared, the accumulator AC-2 remains in its lower position and the amounts of the successive checks are entered into the accumulator AC-1. The accumulator AC-1 is moved into its upper position by means including a cam 411 and an operating segment 412, Fig. 24, of the same character as the segments 722 described in my aforesaid copending application Serial No. 416,745, it being noted that the segment 412 is adapted for movement longitudinally of the axis of the accumulator AC-1 so as to engage the teeth of the segment with an adding control rack 415, Fig. 24, or with a total control rack 416 that corresponds with the control racks 727 and 728 of my aforesaid application. The control racks 415 and 416 are operated through predetermined cycles of movement each time the cam shaft 375 is operated, and the effectiveness of these control racks on the accumulators AC-1 or AC-2 is determined by the engagement of the related segments 412 with one or the other of the control racks, as is described in detail in my aforesaid copending application Serial No. 416,745. Thus in a normal cycle the group total accumulator AC-1 is elevated into its upper position and into engagement with the racks 400 prior to the initiation of the restoring movement of the slides, and during such restoring movements of the racks, the amounts represented by the several racks or slides 400 are entered into the wheels of the accumulator AC-1. After the restoring movement of the slides 400 has been completed, the accumulator AC-1 is returned to its lower position and the required carry-overs are effected in the manner explained in my aforesaid copending application Serial No. 416,745. The restoring movement of the slides 400 of course serves to restore the interposers 365 to their zero positions as shown in Fig. 23 of the drawings.

Figure 5:
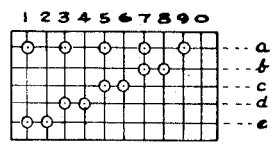
Fig. 5 is a schematic showing of a positional code adapted to be used in a printing and control device of Fig. 4.
Figure 28:
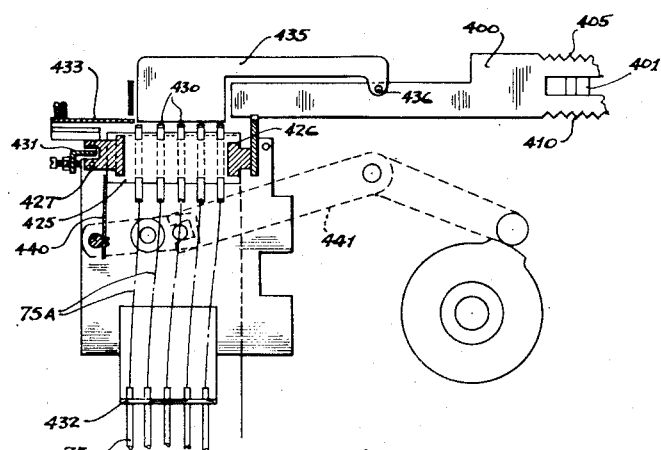
Fig. 28 is a diagrammatic view illustrating the manner in which the set up pins are related to the slides of the accumulator.
Figure 29:
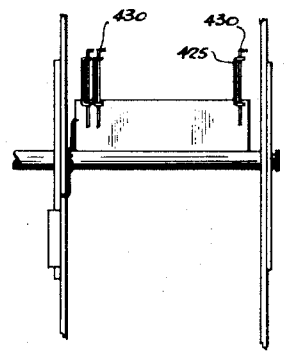
Fig. 29 is an end view of the set up mechanism as viewed from the left in Fig. 28.

The set up means 404 whereby the setting of the slides 400 is controlled is shown in detail in Figs. 25 to 29 of the drawings, and this mechanism is substantially the same for each order of the accumulator, or in other words, for each of the slides 400. Thus, a plurality of set up bars 425 are mounted parallel to and just to the left of the respective slides 400, and these set up bars are supported in guiding combs 426 and 427 for limited longitudinal movement parallel to the path of movement of the slides 400. Each of the set up bars 425 has five set up pins 430 mounted therein by means of slots formed in the horizontal edge flanges of the bars 425 for limited vertical movement. The spacing of the pins 430 is such that the right-hand edges thereof are spaced apart in an amount equal to two units of movement of the related slide 400, while each of the set up bars is adapted to move in an endwise direction through a distance equal to one unit of movement of the related slide 400. At the beginning of each cycle of operation of the machine, all of the set up bars 425 are in their right-hand positions, Fig. 28, but in the course of set up operation of the mechanism, those set up bars that are disposed in orders wherein an even number is to be represented move to the left through one unit of movement and into abutment with stop means 431, as will hereinafter be described in detail. The pins 430 are so arranged that when they are in their lower positions, as shown in Fig. 28, they are disposed below the lower edge of the related slide 400, but when a pin 430 is moved to its upper position, the pin is disposed in the path of movement of the left hand end of the related slide 400 so as to stop the yieldingly induced left hand or set up movement of the slide. The pins 430 are connected to the related Bowden wires 75A, as shown in Fig. 28, the sheaths 75B of the Bowden wires being anchored on an anchoring plate 432 that is disposed in a fixed position beneath the supporting combs of the set up means 404. As to any particular order of the sensing means and the related order of the set up means, the cable 75A that is associated with the index point in row a, Fig. 5, is connected to the most left-hand one of the pins 430 in the related order of the set up means, while the cable 75A that is associated with the index point in the row e of Fig. 5 is connected to the most right-hand one of the pins 430 in the related order of the set up means. The other three cables 75A of this particular group are connected in sequence so that the cable from row b is connected to the second from the left, the cable from row c is connected to the third pin from the left while the cable from row d is connected to the fourth pin from the left. With this arrangement, the set up pin 430 will be actuated each time an odd number is to be represented, and when such a left-hand pin is actuated to its upper positions, it is disposed in such a relation that it will engage a depressible stop plate 433 when forces are applied to the bar 425 in a left-hand direction. Thus under such circumstances the set up bar will move but slightly to the left. As an example, the sensing of perforations 40 in a printing device that are representative of the digit "1" will cause the two end ones of the pins 430 to be moved upwardly, and the left-hand pin will hold the set up bar 425 against appreciable left-hand movement, while the most right-hand pin 430 will stop the movement of the related slide 400 after this slide has moved through one unit of movement. Such action may well be compared with the action in the event that the digit "2" has been represented on the printing and control device. In such an instance only the most right-hand one of the pins 430 will be actuated to its upper position, and hence the related slide 400 will move one unit before it engages the pin 430 that has been set, and will then move through an additional unit until such time as the left-hand end of the set up bar engages the stop plate 433. A similar action is attained with respect to all of the other digits that may be represented by the code of Fig. 5. After the restoring movement of the slides 400 has been completed all of the pins 430 are restored to their lowermost positions, and the restoring movement of the pins 430 is accomplished by a plurality of lever arms 435, one of which is pivotally connected at 436 to each of the slides 400. These lever arms overlie the row of pins 430 that are related to the respective slides upon which such lever arms are mounted, and after the slides have been restored to their zero positions, all of the lever arms 435 are moved downwardly by means of a restoring bail 437 that overlies the several levers 435. Such operation of the restoring bail 437 is accomplished by a link 438 and associated cam means mounted on the cam shaft 375. When the lever arms 435 are in their lower or restored positions the left-hand ends thereof are positioned in engagement with a stop plate 439, and thus each slide 400 will be retained in its zero position unless the actuation of one or more pins 430 has raised the associated lever arm 435 so as to disengage the same from the stop plate 439.

Since the set up bars 425 may in many instances move to the left from the normal positions shown in Fig. 23, means are also afforded for restoring these set up bars to their normal positions. In the present case such means comprise a rocking plate 440 that is operated by a bell crank 441 and cam means, Fig. 28, provided on the cam shaft 375.

Figure 24:
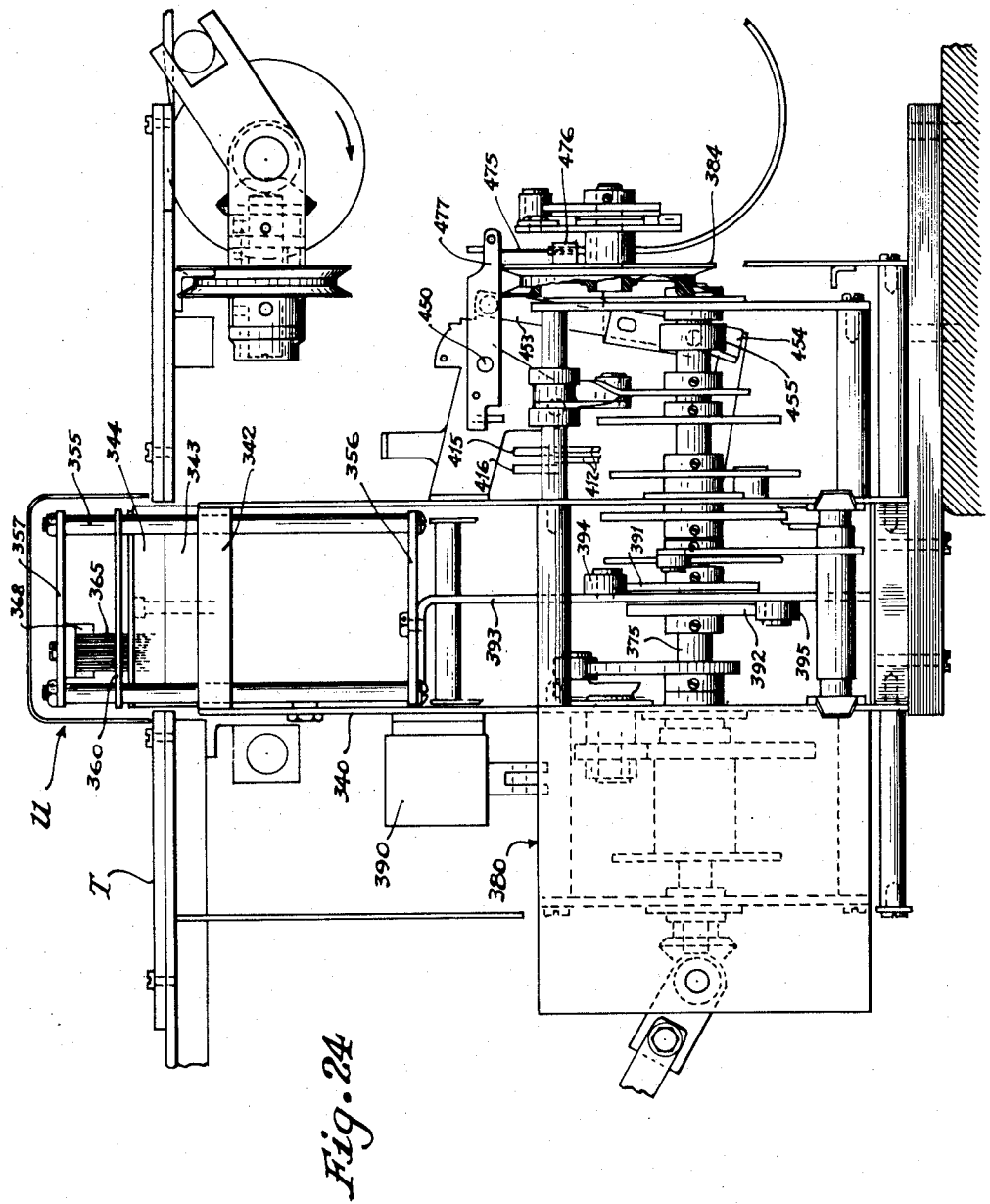
Fig. 24 is a fragmental vertical sectional view illustrating the manner in which the punching elements are associated with the cam shaft of the accumulating unit.
Figure 25:
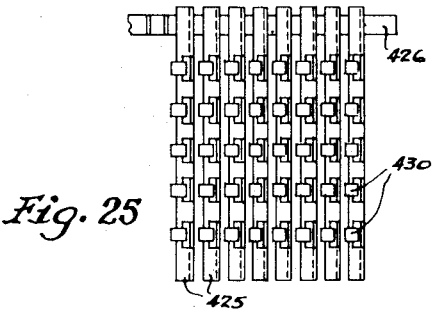
Fig. 25 is a plan view of the set up mechanism for the accumulating unit.
Figure 26:
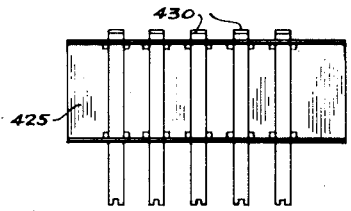
Fig. 26 is a side elevational view of one of the slide bars of the set up mechanism.
Figure 27:
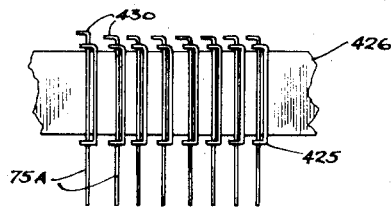
Fig. 27 is an end view of the set up bars and pins.

When a group total is to be read from the accumulator AC-1, this total is punched into a total card, and is also read into the grand total accumulator AC-2, and this is accomplished through selective setting of a total control shaft 450 that extends along the side of the adding and punching unit U and which is arranged to function in substantially the manner of the total control shaft 750 of my copending application Serial No. 416,745. The total control shaft 450 is arranged to be latched in at least two different positions other than its normal position which is shown in Fig. 24 of the drawings, and this shifting or setting movement of the total control shaft 450 may be accomplished by a total control lever 451, Fig. 1, that is disposed outside of the casing of the unit U. When the total control shaft 450 is set to its first position which causes a group total to be taken, it is latched in this position by a latch lever 453 and this latch is released at substantially the end of the machine cycle by a release lever 454 and a cam 455 so that at the end of the total cycle the total control shaft 450 is again in its normal position to which it is urged by spring means that are associated therewith.

The total control shaft 450 has as its function the control of the position of the segments 412 and when the shaft 450 is in its normal position, the segment 412 of the accumulator AC-1 is in engagement with the adding control rack 415, Fig. 24, while the segment 412 of the accumulator AC-2 is in a neutral position so that it is out of engagement with both of the control racks 415 and 416. When the total control shaft 450 is in its first or group total position, the segment 412 of the accumulator AC-1 is engaged with the total control rack 416, while the segment 412 of the accumulator AC-2 is connected to the adding control rack. Thus, as will be evident from a consideration of my aforesaid copending application Serial No. 416,745, the operation of the unit U through a cycle when the control shaft 450 is in its first or group total position results in reading out of the amount standing in the accumulator AC-1 and results concurrently in the reading of this amount into the accumulator AC-2. Such total cycle of the machine may be instituted by depression of a manual total lever 460 that acts mechanically through a lever 460' to release the one-revolution clutch means 380.

At the end of a run of the machine, the accumulator AC-2 will have a total standing therein that constitutes the total of all of the checks produced in the particular run, and a grand total card may then be produced by setting the total control shaft 450 in its second set position or in other words, in its grand total position. In this regard it will be remembered that a group total with respect to the last group of checks should be run prior to the taking of such a grand total in order that the last group total amount may be introduced into the accumulator AC-2. After setting the total control shaft 450 in its second or grand total position, the operation of the unit U may be initiated by the total lever 430 as hereinbefore described.

Figure 6A:
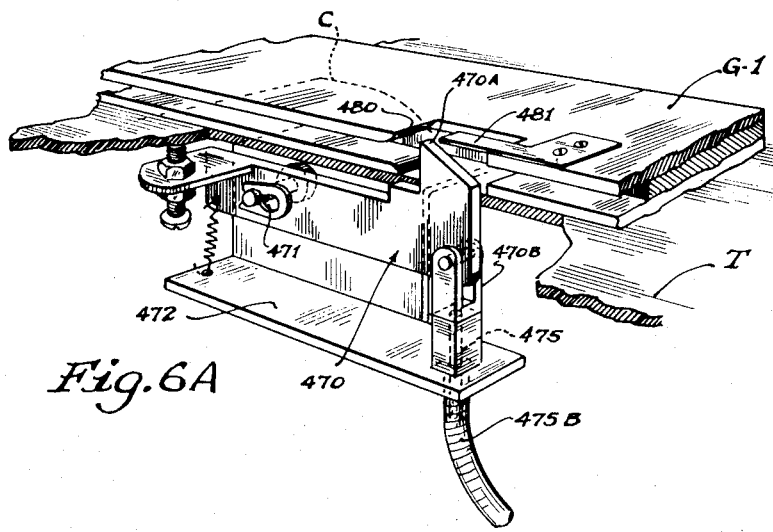
Fig. 6A is a fragmental perspective view illustrating the means for ejecting certain cards or sheets from the sheet guideway.

It has been pointed out that in respect to each group total operation of the unit U, a group total card is produced by the punching means which are of course set up in accordance with the movements of the slides 430 in such total operation, and such group total cards are ejected from the sheet guideway G as soon as they are released from the punching position of the machine so that the operator may place each such group total card with the group of cards or checks to which it pertains. Such ejection of the group total card is effected by a card guiding member 470, Fig. 6A, that is mounted in the rear guide member G-1 of the sheet guideway G so that a cam surface 470A on the member 470 may normally lie in such a position as to constitute a continuation of the lower surface of the guide slot of this guide member of the card guideway. The card guide member 470 is in the form of a lever that is pivoted at 471 on a bracket 472 that is located beneath the table top T, and the card guide member has one end of a Bowden wire 475 connected thereto by a fitting 470B. The sheath 475B of the Bowden wire 475 is anchored on the bracket 472, and the Bowden wire is extended to a point adjacent to the total control shaft 450, at which point the sheath 475 is anchored on a bracket 476, Fig. 24. The other end of the wire 475 is connected to an arm 477, Fig. 24, on the total control shaft 450, and hence when the total control shaft 450 is shifted from its normal position to either one of its total positions, the movement is transmitted through the Bowden wire 475 to the card guide member 470. The total control shaft 450 is of course maintained in its set position until relatively close to the end of the cycle so that the card guide or ejecting member 470 also remains in its set or effective position until late in the machine cycle. Hence the total card, after being punched at the punching station and released by the stop finger 85 advances along the sheet guideway G and it comes into contact with the cam surface 470A so as to thereby be directed upwardly and out of a discharge slot 480 in the sheet guideway G. The operator may then withdraw the card from the slot 480 and place the card with the group of cards or sheets to which it is related. During those times when the ejector member 470 is in its lower or inactive position, the cards are caused to pass the slot 480 by a spring retainer 481 that extends over the slot 480 from the right, as shown in Fig. 6A.

It has been pointed out that the stopping of the machine after the completion of a group of checks or cards C is accomplished under control of the counter 270 and the switch 272 that is closed thereby, and in attaining such stopping action, the switch 272 is arranged to close circuit to a stop solenoid 490 that is mounted on the frame of the machine adjacent to the stop lever 63. The solenoid 490 has its armature 490A pivotally connected at 490B to the stop lever 63, and when the solenoid 490 is energized, the lever 63 is moved in a counterclockwise direction so as to unlatch the one-revolution clutch means and thereby cause the main drive shaft 60 to be disconnected from the constantly operating fly wheel 61 at the end of the machine cycle in which the machine is then operated. As shown in Fig. 16 of the drawings, the solenoid 490 is connected by wires 491 and 492 in series to one terminal of a battery 493, while wires 494 and 494A connect the other terminal of the solenoid 490 to one of the blades of the switch 272. Wires 495 and 496 in series connect the other blade of the switch 272 to the other terminal of the battery 493, so that when the switch 272 is closed, the solenoid 490 will be energized and the machine will be stopped at the end of the cycle.

This machine may also be stopped for other reasons such for example as the absence of a card C as detected by the sheet safety fingers 81, 87 or 91, or by release of the overload mechanism in the printing device advancing means. Thus the sheet safety switch 95 is connected by a wire 500 to the wire 494 and hence to the terminal of the solenoid 490 that is connected to the wire 494, while a wire 502 is extended from the other blade of the switch 95 to the wire 496, thereby to establish a circuit through the wires 502 and 496 to one terminal of the battery 493, the circuit from the other terminal of the battery being extended by wires 491 and 492 in series to the other terminal of the solenoid 490. Thus the closure of the switch 95 due to the absence of a card C at punching station causes the solenoid 490 to be energized and this causes the machine to stop at the end of the cycle.

The switch 181 that is associated with the overload release mechanism of the printing device feed has one of its blades connected by a wire 504 to the wire 496, while a wire 505 connects the other blade of the switch 181 to the wire 494A. This circuit enables closure of the switch 181 to energize the stop solenoid 490.

The switches 98 and 99 are similarly arranged to cause stopping of the machine when the absence of a card causes either of these switches to be closed. Thus a wire 507 is connected from the upper terminal of the solenoid 490 to one contact of the switch 98, while a branch lead 507A is extended from the wire 507 to one contact of the switch 99. A wire 508 extends from the wire 496 and hence from the left-hand terminal of the battery to the other contact of the switch 99, while a branch lead 508A extends from the wire 508 to the other contact of the switch 98. Thus the switches 98 and 99 are arranged in parallel with each other and with the switch 95 so as to have a similar controlling action.

It is also desirable that the stop solenoid 490 be energized in the event that a printing device is not fed into sensing station so as to be available for sensing in the next cycle of operation of the machine, and such control of the machine is attained through the joint action of the normally closed switch 252 and a timing switch 510. The timing switch 510 is disposed on the frame of the machine within the housing 134 and adjacent to the main shaft 60, and the main shaft 60 has a cam 511 thereon that serves as a cam element to close the timing switch 510 late in the cycle of operation of the machine. Such closure of the switch 510 takes place after the operation of the carrier bars 120 has progressed in an amount sufficient to locate a printing device at or close to sensing position in the normal operation of such carrier bars. Thus, in the event that the carrier bars 120 have not advanced a printing device into sensing station, the normally closed switch 252 will remain closed, and upon closure of the timing switch 510 which is in series with the switch 252, the stop solenoid 490 will be energized. Thus, a branch lead 496A is extended from the wire 496 to one blade of the switch 252, thereby to extend circuit from the left-hand terminal of the battery 493 as shown in Fig. 16, and circuit is extended from the other blade of the switch 252 by a wire 512 to one blade of the timing switch 510. A wire 514 extends from the other blade of the switch 510 to the wire 494 so that circuit is thus extended by the wire 494 to one terminal of the stop solenoid 490, the other terminal of the solenoid being connected by wires 491 and 492 in series to the right-hand terminal of the battery 493. Hence it will be clear that in the absence of a printing device at sensing station at the time when the timing switch 510 is closed, the circuit will be completed to the stop solenoid 490 so as to stop the operation of the machine. If, however, a printing device is located at sensing station, the switch 252 will be opened and the closure of the timing switch 510 is without effect.

It has been pointed out that the proper location of a printing device at sensing station and the proper operation of the sensing means are both rendered conditions precedent to the initiation of the operation of the adding and punching unit U, and in accomplishing this purpose, the switches 250 and 251 are arranged in series to control the initiation of operation of the unit U. Thus one terminal of the clutch solenoid 390 that controls the clutch of the unit U is connected by a wire 520 to the right-hand terminal of the battery 493, while the other terminal of the solenoid 390 is connected by a wire 521 to one blade of the switch 251. The other blade of the switch 251 is connected by a wire 522 to one contact of the switch 250, while the other blade of the switch 250 is connected by a wire 523 to the wire 496, thereby to extend the circuit to the left-hand terminal of the battery 493. Thus the circuit to the clutch solenoid 390 is conditioned by closure of the switch 251 when a printing device D is advanced into sensing station. This occurs late in the cycle of operation of the machine and this switch 251 remains closed during the early portions of the next cycle. In such succeeding cycle, the operation of the sensing head S serves to close the switch 250 and thus circuit is completed to the solenoid 390 to initiate operation of the adding and punching unit U. It will be observed of course that the closure of the circuit to the clutch solenoid 390 does not take place until the operation of the Bowden cables 75 has been substantially completed, and hence the set up of the adding and punching unit is accomplished prior to the time when the cycle of operation of the unit U is initiated.

It has been pointed out hereinbefore that while at least certain of the interposers 365 may be operated by the slides 400 of the adding unit, other interposers may be manually set, and in Figs. 30 to 32 of the drawings, an embodiment of the punching means is illustrated whereby this manual setting may be accomplished. In this embodiment of the invention certain of the interposers 365 are associated with arms 408 as hereinbefore described, while manually settable interposers 365A are provided for cooperation with other columns of punches 348. The embodiment shown in Figs. 30 to 32 has the upper head or plate 357 and the stripper plate 360 supported somewhat differently than the previously described embodiment, the rods 355 being terminated at a lower level and having U-shaped brackets 525 secured on the tops of the respective rods 355 by screws 526. The brackets 525 are so arranged that their arms extend horizontally and the plate 357 is secured on the upper one of these arms of each bracket 525 by screws 527. The stripper plate is secured on the upper faces of the lower arms of the brackets 525 by the screws 526. A guide member 368 having longitudinal guide slots therein is fixed on the lower surface of the plate 357 so as to guide the automatically operated interposers 365 in the same manner as in the previously described structure, and where punches are to be manually controlled, the manually operated interposers 365 are disposed in the slots opposite the columns where such manual setting is desired. Adjacent their right-hand ends as shown in Fig. 31, the interposers 365A are supported by a bracket 528, while at their other or left-hand ends as viewed in Fig. 31, the interposers 365A are rested upon a spring detent device 530 that in the present case is in the form of a comb spring supported on a mounting bar 531. The left-hand end portions of the interposers 365A have notches 532 formed at spaced positions therealong for engagement with the pointed end portion 530A of the teeth of the column spring 530, the spacing of the notches 532 corresponding to the spacing of the punches 348 in each column. The other ends of the interposers 565A are extended upwardly as indicated at 365B so as to extend through slots 535 in the plate 357, and this affords finger pieces 365C whereby the interposers 365A may be manually adjusted. A scale 536 is provided along the slots 535 so as to indicate the position of adjustment of the manually set interposers 365A. As will be evident in Fig. 31 of the drawings, the interposers 365A have downwardly extended heads 366A that are aligned with the desired one of the punches 348 as an incident to the manual setting of the interposers 365A, and hence the setting of an interposer 365A in accordance with the scale 536 causes corresponding selection of the desired punch 348 in the related column of punches.

Operation

In the use of the present machine, the card hopper 47 is of course filled with cards C that have been preprinted and prepunched to afford the desired serial numbers 29 thereon, and the cards are placed in the hopper in the proper relationship so that the successively numbered cards will be fed in the proper order from the hopper 47. A supply of printing devices D is also placed in the magazine 56 of the machine, and the driving motor 540 is started into operation by closure of the main switch 541, so as to constantly operate the fly wheel 61 and the pulleys which drive the belts 48 and 49. The machine is then in condition for operation, it being assumed of course that the accumulators AC-1 and AC-2 of the unit U have been cleared by taking of the proper totals from both of these accumulators. The operator then places a scrap sheet of paper beneath the platen P so as to prevent an offset in the first cycle of machine operation, and the operation of the machine may then be initiated by actuation of the starting lever 62 which is of course latched in its effective position by the latching mechanism that is associated with the stop lever 63. The main shaft 60 and the associated cam shafts 70 and 71 will therefore be started through a cycle, and in the course of this machine cycle the printing device advancing means will be operated so as to reciprocate the carrier bars 120 and thereby advance a printing device D from the bottom of the magazine 56 to the sensing station of the machine. In the course of this cycle of operation of the machine, the safety finger 97 will be operated, and since a card is not present at the printing position, the switch 99 will be closed and the stop solenoid 490 will be energized. This operates the stop lever 63 so as to unlatch the one-revolution clutch means, and as a result the machine will come to a stop at the end of this cycle. In the cycle of operation that has just been described, the sensing head S will be moved through a sensing operation early in the machine cycle and at the time before the first printing and control device D has arrived at sensing position. Hence the normally open switch 251 will be open at the time when the switch 250 is closed by the sensing head S, and hence such sensing operation of the sensing head S will not be effective to cause a cycle of operation of the adding and punching unit U.

Because the adding and punching unit U is not operated in the first cycle of operation of the machine as above described, it is necessary for the operator to position the first of the cards C at the punching position, and this may be done manually by removing the lowermost of the cards from the hopper 47 and inserting the same through the throat 346 of the punching means until the card comes into contact with the stop finger 85. The operator must of course position such a card beneath the weight 542 that is removably disposed in the sheet guideway between the hopper 47 and the throat of the punching mechanism. When the first card has thus been located at punching station it is held in firm contact with the stop finger 85 by the action of the opposed rollers 285 and 286, thereby to insure accurate location or registry of the card C with respect to the punches of the punching unit. Another method by which the first card C may be fed to punching station is by operating the unit U through an idle total cycle, and this method is desirable since such an idle total cycle serves to restore the set up pins 430 that were operated in the first cycle of operation of the sensing head as above described.

The machine is then in condition for performance of the first normal sensing and punching operation, but since there is no card located at printing position, the operator again positions a scrap sheet of paper beneath the platen P so as to prevent an offset onto the platen P.

In the next cycle of operation which is about to be instituted, the machine will tend toward continuous automatic operation, and therefore it is necessary, prior to the start of this next operation to set the visual counter 543 and the ratchet-type counter 270 into their zero positions. As to the counter 270, this is accomplished by setting the arm 277 just beyond the point where it contacts and closes the switch 272. The start lever 62 is then actuated so as to engage the one-revolution clutch means, and this again initiates a cycle of operation of the main shaft 60 and the related cam shafts 70 and 71 that are driven thereby. Early in the cycle of operation of the machine the sensing head S is operated through its sensing operation, and in the course of such operation the sensing pins operate through the related Bowden cables 75 to actuate the set up pins 430 of the adding and punching unit U. The downward movement of the sensing head S also serves to close the normally open switch 250, which it will be recalled is in series with the normally open switch 251. The switch 251 is, however, in its conditioned relationship, or in other words it is closed by reason of the presence of a printing device D at the sensing position. The closure of the switch 250 by the action of the sensing head S therefore closes circuit to the clutch solenoid 390 of the adding and punching unit U, thereby to initiate operation of this unit. The operation of the unit U serves of course to start the operation of the card pusher 367 through its retracting movement and it also serves to start the rotation of the secondary stop finger cam shaft 80. The bail that controls the position of the slides 400 also starts through its retracting movement, thereby to permit the set up movement of the slides 400 as indicated in the timing chart of Fig. 33 of the drawings. The movements of the slides 400 are continued until the leading edges of the slides engage the set up pins 430 that have been actuated by the sensing means, and upon completion of the set up movement of the slides 400, the unit U is in condition for operation of the punching head 357 as well as the entry of the set up amount into the accumulator AC-1. It will be recalled that the operation of the slides 400 serves through the arms 408 to set the interposers 365 so that the punching means is ready for operation at the time when the set up movement of the slides 400 has been completed. During the dwell of the slides 400 in their set up positions, the cams on the main cam shaft of the adding and punching unit U act to move the punching head 357 through its downward punching stroke and then upwardly through its withdrawing or stripping stroke, as indicated in the timing chart of Fig. 33. During the time when the slides 400 are located in their set up positions, the accumulator AC-1 is elevated into engagement with the lower racks 410 on the slides 400, and after the slides have been fully engaged with the racks 410, the restoring bail of the unit U starts the restoring movement of the slides 400. In the course of such restoring movement, the amounts for which the slides 400 have been set are read into the accumulator AC-1, and at the end of the restoring movement of the accumulator AC-1 is lowered to its disengaged position and the carry-over mechanism of the accumulator is operated in its cycle of operation where carry-overs are required.

In the cycle of operation wherein the first card C is punched, the carrier bars 120 are retracted during the first half of the machine cycle and after a suitable period of dwell, are moved in a forward or advancing direction so as to advance the first printing device to printing position beneath the platen P and at the same time to advance the second printing device D into position at the sensing station.

The platen P is of course operated in this cycle of operation at the time indicated in the timing chart of Fig. 33, but no impression is made in this cycle since a printing device is not in position at the printing station at this time, and since the operator is at this time holding a blank sheet beneath the platen, an offset thereon is prevented. The operator however, removes such blank sheet immediately after this operation of the platen.

After the completion of the stripping operation of the punching means, the stop finger 85 is raised or released, and the skid roller 290 is lowered, thereby to drive the card that has just been punched in an advancing direction along the sheet guideway G. At the time when this card reaches printing position, the stop finger 77 will be in its lower or active position so that the card will come to rest at printing position. Soon after the card C has come to rest at printing position, the safety finger 97 will be lowered as indicated in the timing chart of Fig. 33, and since a card is at printing position, the sensing operation of the finger 97 will be without effect.

When the first card C has been discharged from the punching station, the stop finger 85 is of course lowered so as to be in a position to stop the next card at punching position, and at this time, the card pusher 307 will have advanced the leading edge of the next card into the bight between the rollers 285 and 286 so that this card will be grasped between these rollers and advanced into contact with the stop finger 85. It will be recalled of course that in the course of advancing movement of the card pusher 307, the safety finger 81 will be operated so as to determine whether or not a card is being pushed out of the hopper 47. In the event that a card has not been engaged and advanced by the card pusher 307, the closure of the switch 98 by the safety finger 81 will of course cause the machine to be stopped at the end of the cycle. After the time when a card should have reached the stop finger 85, the safety finger 87 is operated and in the event that it fails to sense a card in position at punching station, the switch 92 is closed and the stop solenoid 490 is energized so as to cause the machine to stop at the end of the cycle.

Figure 34:
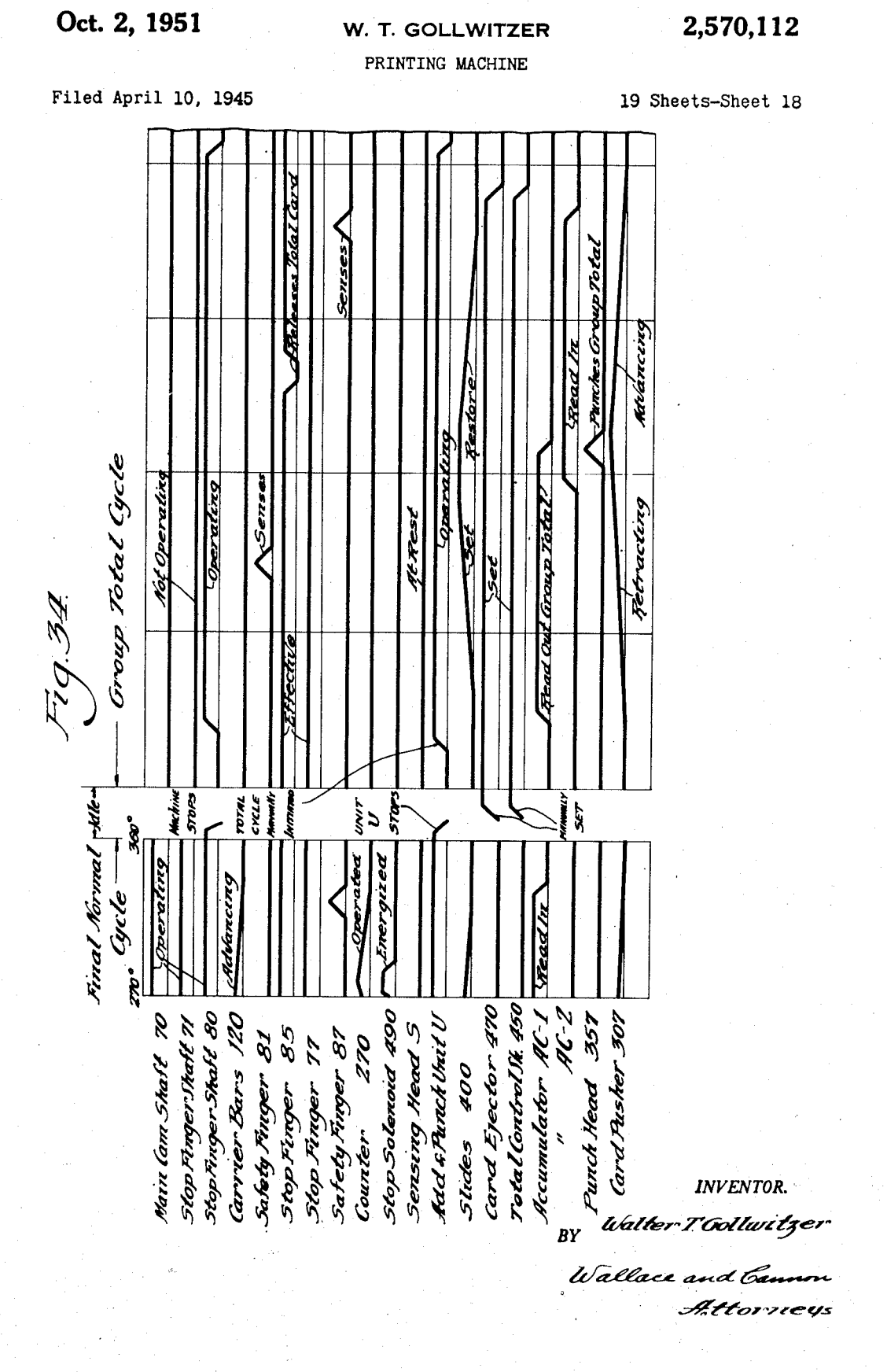

When the machine has thus operated through the cycle in which the first card is advanced into printing position, it is conditioned for the completion or printing of the first card of a group, and since a card has been sensed at the printing position by the safety finger 97, the machine continues in its automatic operation. The machine then operates continuously through a succession of normal cycles in each of which a check or card C is punched and printed and the amount thereof added into the accumulator AC-1. In each such normal cycle of operation, the counter 270 is actuated at substantially the time indicated in the timing chart of Fig. 33, and in the cycle in which the last check of a group is advanced to printing position, the counter 270 is moved through its last position and into its zero position so as to close the associated switch 271 and thereby energize the stop solenoid 490. This indicates to an operator that a total should be taken, and the operator therefore manually sets the total control shaft 450 to its group total position, as indicated in the timing chart of Fig. 34. The total lever 460 is then actuated so as to initiate a total cycle of the unit U, and in the course of this total cycle, the group total is read out of the accumulator AC-1 and into the accumulator AC-2. While the slides 400 are in their dwell positions as determined by the read out from the accumulator AC-1, the punching mechanism is operated as indicated in the timing chart of Fig. 34, to thereby punch the group total into a total card which is then released by the stop finger 85 so as to move forwardly and into operative relationship to the card ejector 470 which has been set as an incident to the setting of the total control shaft 450. The operator then removes the total card that has been ejected from the sheet guideway G, and the automatic operation of the machine is again started by actuation of the start lever 62. As soon as the final card of the group has been printed and discharged from the printing position, the group of cards may be removed from the collecting hopper K and may be stored with the related total card that has just been removed from the guideway G by the operator.

*Alternative embodiment*

In many instances it may be desirable to preserve a continuous record of the amounts punched in the card checks C produced on the machine hereinbefore described, and for this purpose a continuous strip of paper may be led through the throat 346 of the punching mechanism so as to be located above each card C during the punching operation that is performed thereon, and means are provided for advancing the strip of paper in each operation of the machine so that the amounts of the succeeding checks may be represented by groups of perforations spaced apart longitudinally of the strip. Thus as shown in Fig. 35 of the drawings, a supply of paper may be provided on a roll R supported on a shaft 550 carried on a supporting bracket 551 so as to be located above the sheet guideway G somewhat to the left of the punching means. A web W of paper is led from the roll R in a downward direction and beneath a roller 552 that is spaced upwardly in a substantial distance from the sheet guideway G and this web W is led over a roller 553 that is supported by a bracket 554 adjacent to the left hand side of the punching head 357. From the roller 553 the web W is led downwardly and through the throat 346 of the punching mechanism, and at the other or right-hand end of the throat 346 the web is extended upwardly at an angle and beneath a roller 555. From the roller 555 the web W is extended upwardly and is connected to a winding roller 556 that is supported in a horizontal position above the sheet guideway G on a bracket 557. At one end of the shaft or roller 556 a ratchet wheel 558 is fixed, and an advancing rocker 560 having the usual spring pressed ratchet tooth therein is associated with the ratchet wheel 558 so that it may be rocked about the axis of the roller 556. The rocker 560 is operated in timed relation to the operation of the punching unit by means including a vertical link 562 that is pivoted at 563 at its lower end to one end of a guide lever 564. The other end of the guide lever 564 is pivoted at 565 to a part of the frame of the card advancing mechanism, and rocking movements are imparted to the lever 564 and the link 560 by means associated with the shaft 100. In the present case the shaft 100 has an eccentric 570 fixed thereon just inwardly of the crank 105, and this eccentric 570 has a strap 571 disposed in surrounding relationship thereto. The strap 571 has a connecting boss 572 thereon that has one end of a link 573 pivoted thereto, the other end of the link 573 being connected to the pivot 563. The arrangement of the eccentric 570 on the shaft 100 is such that during the first half of the cycle of operation of the unit U, the link 562 is moved in an upward direction through its idle stroke, and after the punching operation has been completed, the eccentric 570 reverses the movement of the link 562, so as to thereby operate the rocker 560 through its active or paper advancing stroke.

Summary

From the foregoing description it will be evident that the present invention materially simplifies and facilitates the preparation of checks and like business instruments having physical data representations incorporated therein, and particularly it will be apparent that this invention enables printing and control devices to be utilized to control the formation of the coded data representations on the checks and the like in the same machine where the printed impressions are formed on the checks.

It will also be apparent that the present invention enables the numerical amounts that are represented on a series of card checks or the like produced as aforesaid to be accumulated, and also enables such accumulated amounts to be represented in group cards produced after a predetermined number of card checks have been passed through the machine. This invention also enables the preparation of such card checks or similar business instruments to be accomplished in such a manner that when a group or total card is produced for a particular group of card checks or the like, the relationship between the card checks that are then in the process of production in the machine will not be disturbed. Moreover, such total cards are ejected from the sheet guideway so that such cards are readily accessible to the operator, and such ejection of the total cards is effected automatically as an incident to the operation of the mechanism through a total cycle.

The machine of the present invention also enables accurate registration of the sheets with the punching means, and this is accomplished in a simple and effective manner. Furthermore, the present invention enables a continuous perforated record of the amounts of the checks or like instruments to be produced, so that this record may readily be utilized in checking or related accounting operations.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a machine for producing business instruments and the like, means affording a sensing station and a printing station, advancing means for advancing printing and control devices, each embodying control means and printing means, one by one to sensing station and to said printing station in succession, means providing a perforating station, means providing a sheet guideway along which sheets may be passed one by one to said perforating station and said printing station in succession, sensing means at said sensing station, impression means at said printing station operable to produce printed impressions from printing devices located at said printing station onto sheets also located at said printing station, settable punching means at said perforating station operable to produce coded perforations in a sheet located at said perforating station, means for setting up said punching means controlled by said sensing means, electrically operable means for causing punching operation after said punching means have been set up as aforesaid, in energizing circuit for said electrically operable means including a pair of normally open switches in series, means operated by a printing device as it is advanced into sensing station to close one of said switches, and means operated by said sensing means for closing the other of said switches as the sensing operation of said sensing means is completed.

2. In a machine for producing business instruments and the like, means affording a table top having a sensing station and a printing station thereon, a printing device guideway along which printing and control devices, each embodying control means and printing means, may be advanced one by one to sensing station and printing station in succession, means affording a sheet guideway along which sheets may be advanced into and out of printing station, impression means at said printing station for forming printed impressions from printing devices onto sheets located at said printing station, punching means defining a punching station in said sheet guideway, an accumulating unit controlling said punching means, set up means for said accumulating unit, sensing means at said sensing station operatively associated with said set up means for setting up said accumulating unit in accordance with the control means of such printing devices as they are sensed by said sensing means, means for driving said accumulating unit including a one-revolution clutch, means operated by said accumulating unit for actuating said punching means in each cycle of operation of the accumulating unit, means for supporting a supply of sheets, sheet separating means driven from said accumulating unit and operable to discharge sheets into said sheet guideway, stop finger means for stopping such sheets in punching position, means for operating said stop finger means driven from said accumulating means, stop finger means for stopping such sheets at printing position, means for operating said last mentioned stop finger means operable in timed relation to said impression means, total control means for said accumulating unit, normally ineffective means operable when effective to eject a sheet from said sheet guideway between said punching station and said printing station, and means operated by said total control means for rendering said ejecting means effective.

3. In a machine for producing business instruments and the like, means affording a sensing station and a printing station, advancing means for advancing printing and control devices, each embodying control means and printing means, one by one to sensing station and to said printing station in succession, sensing means at said sensing station, means providing a perforating station, means providing a sheet guideway along which sheets may be passed one by one to said perforating station and said printing station in succession, sheet feeding means for feeding sheets along said guideway and including a stop finger for stopping sheets at printing station, impression means at said printing station operable to produce printed impressions from printing devices located at said printing station onto sheets also located at said printing station, driving means for operating said stop finger, said printing device advancing means, said sensing means and said impression means in timed relation through a cycle of operation, means for disconnecting said driving means at the end of a cycle of operation of the means driven thereby, an adding and punching unit disposed at said perforating station operable to produce coded perforations in a sheet located at said perforating station, sheet separating means operated in timed relation to said adding and punching unit and operable to feed sheets one by one into said sheet guideway, another stop finger operated in timed relation to said adding and punching unit and operable to stop each sheet at said perforating station, means for setting up said punching means controlled by said sensing means, means operable after a predetermined number of impressions have been made by said impression means to operate said disconnecting means, total control means for causing a total operation of said adding and punching unit, and means operable as an incident to such a total taking operation to eject the punched total sheet from said sheet guideway.

4. In a printing machine of the character described, means affording a table top having a sheet guideway extended thereacross, means defining a printing device guideway beneath said table top and extended transversely with respect to said sheet guideway so as to define a printing station at the intersection of the sheet guideway and the printing device guideway, reciprocable carrier bars in said printing device guideway whereby printing and control devices each embodying control means and printing means, may be advanced one by one to sensing station and then to printing station, impression means disposed at printing position for producing impressions from a printing device onto a sheet, a main cam shaft, drive means for said main cam shaft including one-revolution clutch means, latch means for maintaining said clutch means engaged, stop means for disengaging said latch means, means affording an operative connection between said impression means and said main cam shaft for operating said impression means through an operative cycle when said main cam shaft is rotated through a cycle, means for imparting controlled step-by-step advancing movement to the sheets in said sheet guideway and operable to stop such sheets at printing position, a rocking lever operated from said main cam shaft, a rack reciprocated by said rocking lever, a pinion meshed with and oscillated by said rack, a driving lever connected to said carrier bars for reciprocating said carrier bars, means including an overload release mechanism forming an operative connection between said pinion and said driving lever to impart rocking movements to said driving lever, and means operated by said overload release mechanism as an incident to release thereof to operate said stop means.

5. In a machine for producing business instruments and the like, means affording a table top having a sensing station and a printing station thereon, a printing device guideway along which printing and control devices, each embodying control means and printing means, may be advanced one by one to sensing station and printing station in succession, means affording a sheet guideway along which sheets may be advanced into and out of printing station, impression means at said printing station for forming printed impressions from printing devices onto sheets located at said printing station, means for operating said impression means, punching means defining a punching station in said sheet guideway, set up means for said punching means, sensing means at said sensing station operatively associated with said set up means for setting up said punching means in accordance with the control means of such printing devices as they are sensed by said sensing means, driving means including a one-revolution clutch for operating said punching means, means for supporting a supply of sheets, sheet separating and feeding means driven from said driving means and operable to discharge sheets into and feed sheets along said sheet guideway, stop finger means for stopping such sheets in punching position, stop finger means for stopping such sheets at printing position, separate drive means for operating each of said stop finger means, and means operative in certain cycles to cause operation of said drive means for the stop finger at the punching station only.

6. In a machine of the character described, a card feed guideway, means for imparting controlled advancing movements to cards along said guideway, a card magazine disposed in alignment with one end of said guideway for holding a supply of cards, a card feed slide mounted in the bottom of the said magazine for reciprocating movement toward and from an end of said guideway, and means for actuating said card feed slide comprising a shaft having a drum fixed thereon, an elongated flexible member having one end secured to said drum and the other end secured to said slide, guide means disposed about said drum for confining and guiding said flexible member, and drive means for said shaft comprising a pinion loosely mounted on said shaft, a rack for oscillating said pinion, and means affording an overload release connection between the said pinion and said shaft for transmitting said oscillating movements of said pinion to said shaft.

7. In a machine of the character described, a sheet guideway along which sheets or cards may be advanced into and through one or more operating stations at which operations may be performed on such sheets or cards, sheet advancing means operable to advance sheets into said sheet guideway, means including at least one constantly operating belt for advancing sheets along said guideway, means including a stop finger cam shaft and a stop finger operated thereby for stopping movement of such sheets at one of said positions, means for maintaining such a sheet in engagement with such stop finger comprising a driven roll disposed in said guideway and constantly driven in a direction adapted to advance a sheet along said guideway, and a resiliently pressed pressure roller disposed in opposing relation to said advancing roller for maintaining a sheet in contact with said advancing roller, a roller for firmly engaging such a sheet with said belt, means supporting said last-mentioned roller for movement between effective and ineffective positions, and means operated by said cam shaft for rendering said last-mentioned roller effective when said stop finger is rendered ineffective.

8. In a machine for producing business instruments and the like, means affording a table top having a sensing station and a printing station thereon, a printing device guideway along which printing and control devices, each embodying control means and printing means, may be advanced one by one to sensing station and printing station in succession, means affording a card guideway along which cards may be advanced into and out of printing station, impression means at said printing station for forming printed impressions from printing devices onto cards located at said printing station, punching means defining a punching station in said card guideway, an accumulating unit controlling said punching means, set up means for said accumulating unit, sensing means at said sensing station operatively associated with said set up means for setting up said accumulating means in accordance with the control means of such printing devices as they are sensed by said sensing means, means for driving said accumulating unit including a one-revolution clutch, means operated by said accumulating unit for actuating said punching means in each cycle of operation of the accumulating unit, a card magazine disposed near one end of said card guideway for holding a supply of cards, a card feed slide mounted in the bottom of the said magazine for reciprocating movement toward and away from said end of said card guideway, and means for actuating said card feed slide comprising a shaft having a drum fixed thereon, an elongated flexible member having one end secured to said drum and the other end secured to said slide, guide means disposed about said drum for confining and guiding said flexible member, means driven from said accumulating unit for imparting oscillating movements to said shaft to thereby impart reciprocating movements to said card feed slide, stop finger means for stopping such cards in punching position, means for operating said stop finger means driven from said accumulating means, stop finger means for stopping such cards at printing position, means for operating said last mentioned stop finger means operable in timed relation to said impression means, total control means for said accumulating unit, normally ineffective means operable when effective to eject a card from said card guideway between said punching station and said printing station, and means operated by said total control means for rendering said ejecting means effective.

9. In a machine for producing business instruments and the like, means affording a sensing station and a printing station, advancing means for advancing printing and control devices, each embodying control means and printing means, one by one to sensing station and to said printing station in succession, means providing a perforating station, means providing a sheet guideway along which sheets may be passed one by one to said perforating station and said printing station in succession, impression means at said printing station operable to produce printed impressions from printing devices located at said printing station onto sheets also located at said printing station, sensing means at said sensing station, settable punching means at said perforating station and having a throat aligned with said guideway and through which sheets may be passed into operative punching relationship to said punching means so that said punching means may be operated to produce coded perforations in a sheet located at said perforating station, means for guiding an elongated web of paper through said throat of said punching means, and means operated in timed relation to the operation of said punching means to impart step-by-step advancing movement to such a web of paper, means for setting up said punching means controlled by said sensing means, means for causing punching operation of said punching means after said punching means have been set up as aforesaid.

10. In a machine for producing business instruments and the like, means affording a table top having a sensing station and a printing station thereon, a printing device guideway along which printing and control devices, each embodying control means and printing means, may be advanced one by one to sensing station and printing station in succession, means affording a sheet guideway along which sheets may be advanced into and out of printing station, impression means at said printing station for forming printed impressions from printing devices onto sheets located at said printing station, punching means defining a punching station in said printing device guideway, set up means for said punching means, sensing means at said sensing station operatively associated with said set up means for setting up said punching means in accordance with the control means of such printing devices as they are sensed by said sensing means, driving means for operating said punching means including a one-revolution clutch, means for supporting a supply of sheets, sheet separating means driven from said driving means and operable to discharge sheets into said sheet guideway, means including at least one constantly operating belt for advancing sheets along said sheet guideway, means including a stop finger for stopping movement of such sheets at said punching position, means for operating said stop finger driven from said driving means, means for maintaining such a sheet in engagement with such stop finger comprising a driven advancing roll having a smooth peripheral surface and disposed in said sheet guideway and constantly driven in a direction adapted to advance a sheet along said sheet guideway, and a resiliently pressed pressure roller disposed in opposing relation to said advancing roller for maintaining a sheet in contact with said advancing roller, stop finger means for stopping such sheets at printing position, and means for operating said last mentioned stop finger means operable in timed relation to said impression means.

WALTER T. GOLLWITZER.

(References on following page)

REFERENCES CITED

The following references are of record in the file of this patent:

UNITED STATES PATENTS

| Number | Name | Date |
|---|---|---|
| Re. 21,208 | Gollwitzer | Sept. 19, 1938 |
| 1,443,312 | Day | Jan. 23, 1923 |
| 1,772,180 | Ford | Aug. 5, 1930 |
| 1,916,966 | Cunningham | July 4, 1933 |
| 1,978,849 | Ulfeng | Oct. 30, 1934 |
| 2,034,104 | Lasker | Mar. 17, 1936 |
| 2,132,413 | Gollwitzer | Oct. 11, 1938 |
| 2,168,763 | Daly | Aug. 8, 1939 |
| 2,221,500 | Upham | Nov. 12, 1940 |
| 2,270,871 | Felber | Jan. 27, 1942 |
| 2,296,277 | Gollwitzer | Sept. 22, 1942 |
| 2,356,995 | Gollwitzer | Aug. 29, 1944 |
| 2,390,587 | Hatfield | Dec. 11, 1945 |
| 2,406,205 | Davidson et al. | Aug. 20, 1946 |
| 2,464,569 | Ford | Mar. 15, 1949 |